(12) United States Patent
Harrison et al.

(10) Patent No.: US 10,659,731 B2
(45) Date of Patent: May 19, 2020

(54) AUTOMATED CINEMATIC DECISIONS BASED ON DESCRIPTIVE MODELS

(71) Applicant: Facebook, Inc., Menlo Park, CA (US)

(72) Inventors: Jason Francis Harrison, San Jose, CA (US); Eric W. Hwang, San Jose, CA (US); Rahul Nallamothu, Sunnyvale, CA (US); Shahid Razzaq, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/153,613

(22) Filed: Oct. 5, 2018

(65) Prior Publication Data
US 2019/0313058 A1 Oct. 10, 2019

Related U.S. Application Data

(60) Provisional application No. 62/655,751, filed on Apr. 10, 2018.

(51) Int. Cl.
*H04N 7/15* (2006.01)
*G06K 9/62* (2006.01)
(Continued)

(52) U.S. Cl.
CPC .......... *H04N 7/15* (2013.01); *G06K 9/00268* (2013.01); *G06K 9/00362* (2013.01); *G06K 9/32* (2013.01);
(Continued)

(58) Field of Classification Search
CPC ............... H04N 7/155; H04N 5/23299; H04N 5/23296; H04R 3/005; H04R 1/406
See application file for complete search history.

(56) References Cited

U.S. PATENT DOCUMENTS 5,845,009 A   12/1998  Marks
9,912,907 B2* 3/2018  De Magalhaes ......... H04N 7/15
(Continued)

FOREIGN PATENT DOCUMENTS

EP  2701096 A2   2/2014
EP  3063730 A1   9/2016
WO  WO 0018128 A1  3/2000

OTHER PUBLICATIONS

International Search Report and Written Opinion for International Application No. PCT/US2019/026684, dated Jun. 18, 2019.
(Continued)

*Primary Examiner* — Stella L. Woo
(74) *Attorney, Agent, or Firm* — Baker Botts L.L.P.

(57) ABSTRACT

In one embodiment, a method includes accessing input data from one or more different input sources. The input sources include: one or more cameras, one or more microphones, and a social graph maintained by a social-networking system. Based on the input data, generating a current descriptive model for a current audio-video communication session that comprises one or more descriptive characteristics about (1) an environment associated with the current audio-video communication session, (2) one or more people within the environment, or (3) one or more contextual elements associated with the current audio-video communication session. The method also includes generating one or more instructions for the current audio-video communication session that are based the one or more descriptive characteristics; and sending the one or more instructions to a computing device associated with the one or more cameras and the one or more microphones.

20 Claims, 18 Drawing Sheets

(51) Int. Cl.
*H04N 5/262* (2006.01)
*G06K 9/00* (2006.01)
*G06K 9/46* (2006.01)
*G06T 7/246* (2017.01)
*G06T 7/73* (2017.01)
*G06K 9/32* (2006.01)
*H04N 5/232* (2006.01)
*H04N 7/14* (2006.01)
*G06T 7/194* (2017.01)
*H04R 1/40* (2006.01)
*H04R 3/00* (2006.01)

(52) U.S. Cl.
CPC ......... *G06K 9/4652* (2013.01); *G06K 9/6202* (2013.01); *G06K 9/6212* (2013.01); *G06K 9/6215* (2013.01); *G06T 7/194* (2017.01); *G06T 7/246* (2017.01); *G06T 7/73* (2017.01); *H04N 5/23219* (2013.01); *H04N 5/23222* (2013.01); *H04N 5/23296* (2013.01); *H04N 5/23299* (2018.08); *H04N 5/262* (2013.01); *H04N 5/2628* (2013.01); *H04N 7/147* (2013.01); *H04N 7/155* (2013.01); *H04R 1/406* (2013.01); *H04R 3/005* (2013.01); *G06T 2207/10016* (2013.01); *G06T 2207/20044* (2013.01); *G06T 2207/20221* (2013.01)

(56) References Cited

U.S. PATENT DOCUMENTS 9,942,518 B1* 4/2018 Tangeland ............. H04N 7/152
2003/0103647 A1 6/2003 Rui
2011/0285808 A1* 11/2011 Feng ...................... H04N 7/142
348/14.09
2012/0327172 A1 12/2012 El-Saban
2012/0327179 A1* 12/2012 Watson ................. H04N 5/232
348/14.08
2013/0230211 A1 9/2013 Tanabiki
2014/0132638 A1 5/2014 Matas
2016/0308920 A1 10/2016 Brunsch
2016/0381306 A1* 12/2016 Yang ......................... G06T 3/40
386/280
2017/0200279 A1 7/2017 Zhong
2017/0337692 A1 11/2017 Romanenko
2018/0176508 A1* 6/2018 Pell ........................ H04N 7/147

OTHER PUBLICATIONS

International Search Report and Written Opinion for International Patent Application PCT/US2019/026668, dated Jun. 7, 2019.
International Search Report and Written Opinion for International Patent Application PCT/US2019/026685, dated Jun. 11, 2019.
International Search Report and Written Opinion for International Patent Application PCT/US2019/026682, dated Jun. 17, 2019.
Alexander Kläser, "Human Detection and Action Recognition in Video Sequences", Retrieved from the Internet, Oct. 13, 2006.
Komagal et al., "Face Recognition Across Pose for PTZ Camera Video Surveillance Applications", ICAPR, IEEE, pp. 1-6, Dec. 27, 2017.

* cited by examiner

1200

1210 — accessing input data from one or more different input sources, the input sources comprising: one or more cameras, one or more microphones, and a social graph maintained by a social-networking system 1220 — based on the input data, generating a current descriptive model for a current audio-video communication session that comprises one or more descriptive characteristics about (1) an environment associated with the current audio-video communication session, (2) one or more people within the environment, or (3) one or more contextual elements associated with the current audio-video communication session 1230 — generating one or more cinematic instructions for the current audio-video communication session that are based the one or more descriptive characteristics 1240 — sending the one or more cinematic instructions to a computing device associated with the one or more cameras and the one or more microphones

1310 — accessing foreground visual data that comprises a set of coordinate points that correspond to a plurality of surface points of a person in an environment 1320 — generating a bounding box for the set of coordinate points, wherein the bounding box comprises every coordinate point in the set of coordinate points 1330 — providing instructions to collect background visual data for an area in the environment that is outside of the bounding box 1340 — providing the foreground visual data and the background visual data to an intelligent director associated with the computing device

1510 — identifying, from a set of coordinate points that correspond to a plurality of surface points of a person in an environment, a coordinate point that corresponds to a facial feature of the person 1520 — generating a facial structure for a face of the person, wherein the facial structure covers a plurality of facial features of the person and substantially matches a pre-determined facial structure 1530 — generating a body skeletal structure for the person, wherein the body skeletal structure substantially matches a predetermined body skeletal structure and substantially aligns with the generated facial structure in at least one dimension of a two-dimensional coordinate plane 1540 — associating the generated body skeletal structure and facial structure with the person in the environment 1550 — determining one or more instructions for a camera, microphone, speaker, or display screen based on the generated body skeletal structure and facial structure

*FIG. 15*

AUTOMATED CINEMATIC DECISIONS BASED ON DESCRIPTIVE MODELS

PRIORITY

This application claims the benefit, under 35 U.S.C. § 119(e), of U.S. Provisional Patent Application No. 62/655,751, filed 10 Apr. 2018, which is incorporated herein by reference.

TECHNICAL FIELD

This disclosure generally relates to video conferencing.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include information that the user has entered. The information may be public or private, depending on the user's privacy settings, and may include, communication-channel information, and. The social-networking system may also, with input and permission from a user, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, laptop computer, or dedicated audio/video communication interface—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

An intelligent communication device may be used for audio/visual communications, such as live or video chats or pre-recorded audio/visual presentations. The intelligent communication device may be a dedicated communication device that resides in a user's home or office. The intelligent communication device may have a touch sensitive display screen, speakers, one or more cameras, and one or more microphones. The device may access user information in accordance with privacy settings specified by the device's owner and each user that comes within the visual field of the device. For example, the device owner may specify that under no circumstances may the device access information about anyone that is stored by the social-networking system. In this scenario, the device would not communicate with remote servers with regard to any type of user information. As another example, the device owner may specify that the device may access information stored by the social-networking system to enhance the user's experience (as will be discussed below). In this scenario, the device may communicate with the social-networking system with regard to the device owner's social-networking data, but the device will continue to check for permission to access other user's social-networking data. For example, if the device owner has opted into social-networking data access, but the device owner's friend has not opted in, the device will not access the friend's social-networking data.

The intelligent communication device may have internal processing that enables it to make automated cinematic decisions that imitate the cinematic decisions a human would make. Such cinematic decisions may include any choice a human director would make if she were controlling the camera(s) and microphone(s) (e.g., generating cinematic cuts), as well as any decision that might be available by way of a video editor (e.g., choosing to apply visual effects on the fly). Such choices may include zooming in on a single person if that person is talking and has specified that she allows the device to zoom in on her (e.g., in a privacy settings interface associated with the social-networking system), panning or cutting to another person, zooming out on a scene that has a lot of activity, beamforming a microphone to a particular sound source if the device owner and sound source(s) allow such functionality, and other suitable decisions. To make these determinations, an intelligent director may access a descriptive model of a current audio-visual communication session ("AV communication session") between two or more users. The intelligent director may reside in the intelligent communication device or it may reside in a remote server. The descriptive model may include, subject to privacy settings of the device owners and each of the relevant users, (1) non-identifying information related to the environment in which the sending intelligent communication device is located; (2) non-identifying information about one or more people located in the sending device's environment; (3) non-identifying information related to the environment in which the recipient's intelligent communication device is located; (4) non-identifying information about one or more people located in the recipient device's environment; and (5) non-identifying information about the context surrounding the current audio-video communication session. A user is a relevant user for such purposes if the device triggers a retrieval of information about that user from a remote server. From these inputs as well as other manual inputs from any participating user and privacy settings by any of the captured users, the intelligent director may make cinematic decisions related to visual targets (e.g., zoom in on one person in particular if that person has allowed zoom-ins), audio targets (e.g., amplify a particular sound source relative to other sound sources if the sound source has allowed sound amplification), or style (e.g., smooth vs. fast transitions between visual targets).

In particular embodiments, the visual data that is sent to devices engaged in an audio-visual communication session may undergo one or more of at least three types of visual processing, if the device owner and any relevant user has allowed such functionality: (1) background/foreground modelling; (2) reidentifying people; or (3) disambiguating overlapping people. Background/foreground modelling may include using bounding boxes for human skeletons, based on real-time multi-person 2D POSE estimation data and gathering background data only for the areas outside the bounding boxes. Reidentifying people may involve identifying one or more human skeletons and generating one or more descriptive characteristics about each human skeleton. If the device owner and all relevant users have expressly opted in to this functionality, the descriptive characteristics may include a color histogram of the person corresponding to the human skeleton, a current location and trajectory, and a set of ratios associated with the human skeleton (e.g., hip-to-shoulder ratio). If a human skeleton needs to be re-identified, the system may rely on the descriptive characteristics to reidentify the human skeleton. In particular embodiments, the re-identification is not an actual identification where the device or backend system determines the identity of a person associated with the human skeleton, but is rather a non-identifying identification of "skeleton A," where the identity of the corresponding person is not determined or recorded, even temporarily. Disambiguating overlapping people aims to separate out people whose human skeletons share the same bounding box or whose bounding boxes overlap. It involves, among other things, mapping each person's face to a set facial structure and building out a "human tree" based on the mapping. Here again, in such embodiments, none of the persons' identities are determined or recorded, even temporarily. These and other embodiments are explained in more detail below.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 12 illustrates an example method for determining cinematic decisions based on a descriptive model of an environment.

FIG. 13 illustrates an example method for determining a foreground and background description during an audio-video communication session.

FIG. 15 illustrates an example method for disambiguating overlapping people during an audio-video communication session.

DESCRIPTION OF EXAMPLE EMBODIMENTS

Figure 1:
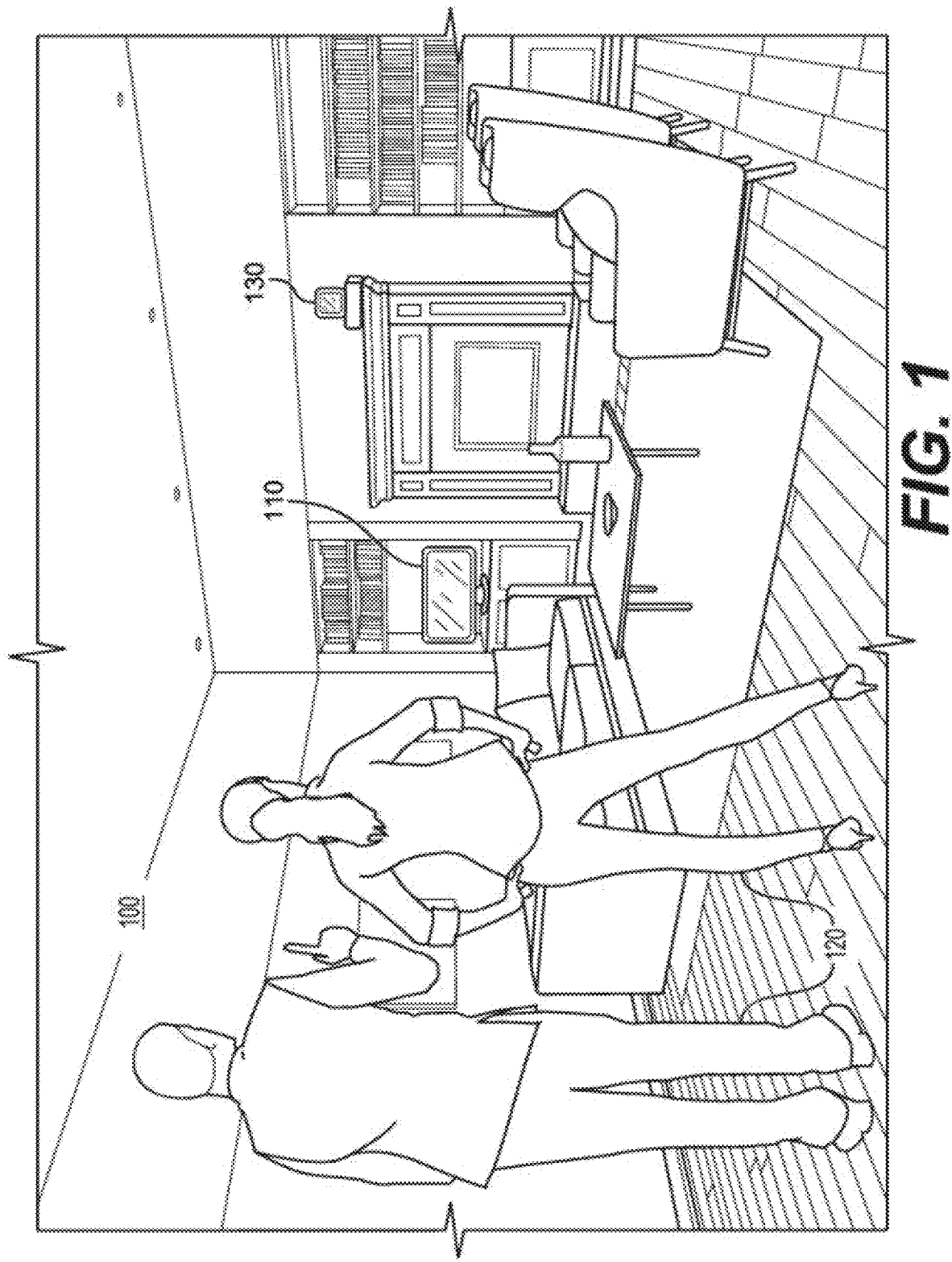
FIG. 1 illustrates an example intelligent communication device in an example living room setting.

An intelligent communication device may be used for audio/visual communications, such as live or video chats or pre-recorded audio/visual presentations. The intelligent communication device may be a dedicated communication device that resides in a user's home or office. The intelligent communication device may have a touch sensitive display screen, speakers, one or more cameras, and one or more microphones. The intelligent communication device may have internal processing that enables it to make automated cinematic decisions that imitate the cinematic decisions a human would make. Such cinematic decisions may include any choice a human director would make if she were controlling the camera(s) and microphone(s) (e.g., generating cinematic cuts), as well as any decision that might be available by way of a video editor (e.g., choosing to apply visual effects on the fly). Such choices may include zooming in on a single person if that person is talking and has specified that she allows the device to zoom in on her (e.g., in a privacy settings interface associated with the social-networking system), panning or cutting to another person, zooming out on a scene that has a lot of activity, beamforming a microphone to a particular sound source, applying real-time special effects, and other suitable decisions. To make these determinations, an intelligent director may access a descriptive model of a current AV communication session between two or more users. The intelligent director may reside in the intelligent communication device or it may reside in a remote server. The descriptive model may include, subject to privacy settings of the device owners and each of the relevant users, (1) non-identifying information related to the environment in which the sending intelligent communication device is located; (2) non-identifying information about one or more people located in the sending device's environment; (3) non-identifying information related to the environment in which the recipient's intelligent communication device is located; (4) non-identifying information about one or more people located in the recipient device's environment; and (5) non-identifying information about the context surrounding the current audio-video communication session. From these inputs as well as other manual inputs from any participating user, the intelligent director may make cinematic decisions related to visual targets (e.g., zoom in on one person in particular), audio targets (e.g., amplify a particular sound source relative to other sound sources), or style (e.g., smooth vs. fast transitions between visual targets).

In particular embodiments, the visual data that is sent to devices engaged in an AV communication session may undergo one or more of at least three types of visual processing: (1) background/foreground modelling; (2) reidentifying people; and (3) disambiguating overlapping people. Background/foreground modelling may include identifying bounding boxes for human skeletons based on real-time multi-person 2D POSE estimation data and gathering background data only for the area outside the bounding boxes. Reidentifying people may involve identifying one or more human skeletons and generating one or more descriptive characteristics about each human skeleton. The descriptive characteristics may include a color histogram of the person corresponding to the human skeleton, a current location and trajectory, and a set of ratios associated with the human skeleton (e.g., hip-to-shoulder ratio). These descriptive characteristics are not used to perform an actual identification where the device or backend system determines the identity of a person associated with the human skeleton, but are rather used to determine a non-identifying identification of "skeleton A," where the identity of the corresponding person is not determined or recorded, even temporarily. If a human skeleton needs to be reidentified, the system may rely on the descriptive characteristics to reidentify the human skeleton. Disambiguating overlapping people aims to separate out people whose human skeletons share the same bounding box, or who have separate but overlapping bounding boxes. It involves mapping each person's face to a set facial structure and building out a "human tree" based on the mapping. These and other embodiments will be explained in more detail below.

FIG. 1 illustrates an example intelligent communication device in an example living-room setting. Note that "intelligent communication system 130" may also be referred to herein as "client system 130," and these terms may be used interchangeably throughout this disclosure. Although FIG. 1 illustrates the example environment as a living room setting, this is merely an example of where the intelligent communication device may be located. It is contemplated that intelligent communication device 130 may be located in any suitable setting indoors or outdoors, including the kitchen, bedrooms, hallways, backyards, parks, the beach, or any other environment. The environment 100 may include the intelligent communication device 130 and many other types of objects, including people 120, and furniture, including television 110. The objects may either make up the background or the foreground of the environment. Background objects may be those objects that remain substantially unchanged throughout the duration of an AV communication session. Background objects typically include walls, furniture, appliances, doors, doorways, ceiling fans, chandeliers, etc. Foreground objects move around and/or emit sounds. Foreground objects generally include people and pets. In particular embodiments, foreground objects may also include inanimate objects, such as a television or radio, or toys (e.g., an RC racecar). In order to make appropriate cinematic decisions, the intelligent director may need to differentiate between background objects and foreground objects. That way, the intelligent director can appropriately identify people and other objects that move in the foreground. This process is explained in more detail below with reference to FIG. 7.

Figure 2:
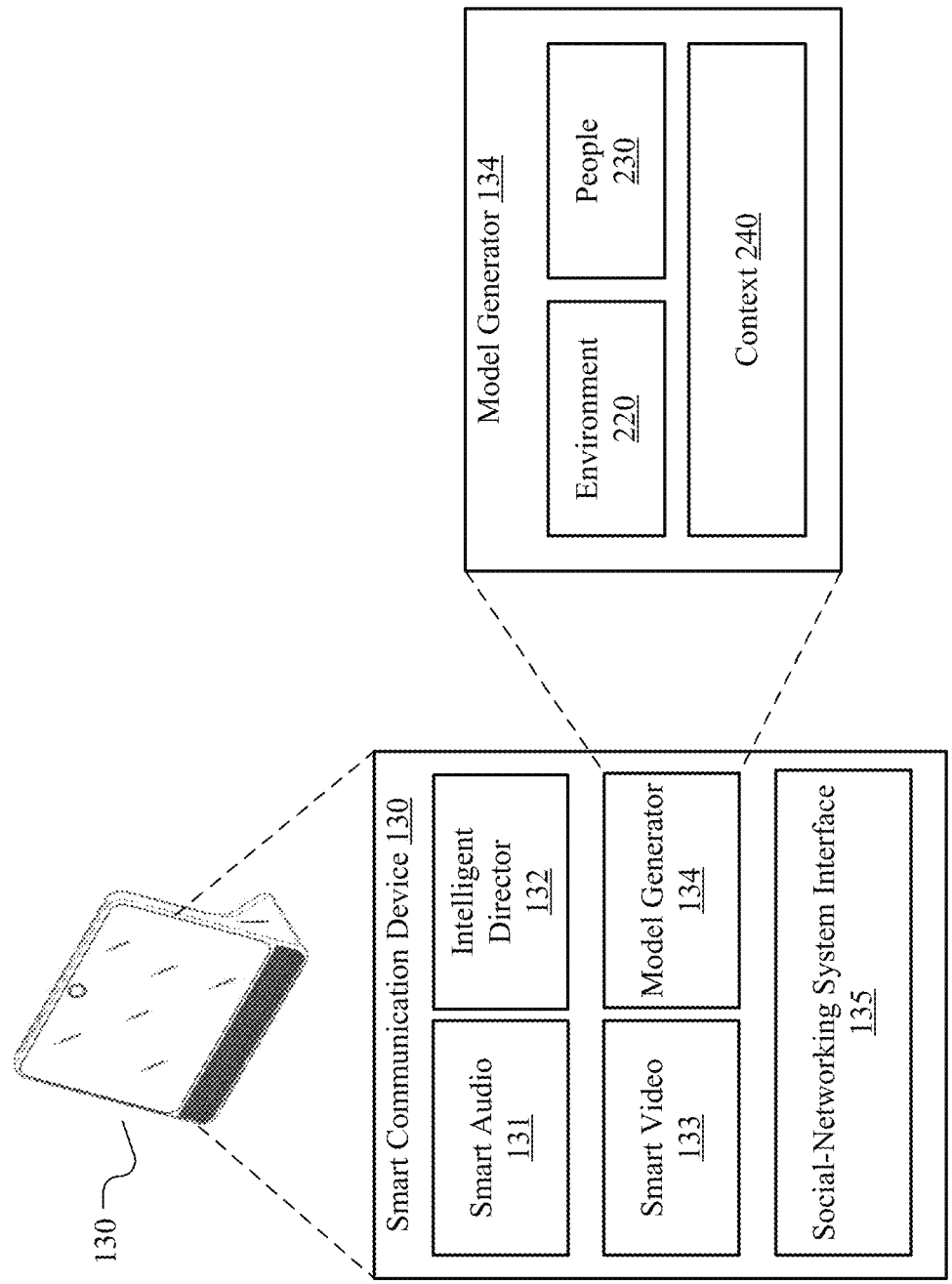
FIG. 2 illustrates an example intelligent communication device with example components.

FIG. 2 illustrates an example intelligent communication device 130 with example components. Example components include a smart audio component 131, an intelligent director 132, a smart video component 133, a model generator 134, and a social-networking interface 135. Each of the components have or use the necessary processing and storage units to perform the functions discussed in this disclosure. The following discussion of model generator 134 and its associated modules and their functionality are subject to privacy settings of (1) the owner of the intelligent communication device 130, and (2) each user who is within the visual or audio space of the intelligent communication device 130. For example, the device owner may specify that under no circumstances may the device access information about anyone that is stored by the social-networking system. In this scenario, the device would not communicate with remote servers with regard to any type of user information. As another example, the device owner may specify that the device may access information stored by the social-networking system to enhance the user's experience (as will be discussed below). In this scenario, the device may communicate with the social-networking system with regard to the device owner's social-networking data, but the device will continue to check for permission to access other user's social-networking data. For example, if the device owner has opted into social-networking data access, but the device owner's friend has not opted in, the device will not access the friend's social-networking data. At a minimum, the device may identify a user for the limited purpose of determining whether the user allows access to his or her social-networking information or other identifying information. If the user does not allow such access, the device will not identify the user for any other purpose. Such privacy settings may be configured by the user on a settings interface associated with an account of the user on the online social network, as is discussed herein.

Model generator 134 may include three modules: an environment module 220, a people module 230, and a context module 240. Environment module 220 may generate information about the environment in which the intelligent communication device 130 is located in. As an example and not by way of limitation, environment module 220 may determine that its environment is indoors, and, subject to privacy settings of the device owner and any relevant user, may also determine various characteristics of the environment, such as the locations of walls, walkways, and furniture. This information may be gathered to enhance the viewing experience of viewing participants by enabling the intelligent director 132 to make more intelligent cinematic decisions. For example, if the device owner has opted in to allowing the device 130 to determine a room's layout, the environment module 220 contains information that a wall exists at a particular location, the intelligent director may instruct the camera to pan no further than the wall, because no user would walk through the wall. This information remains on the device 130 and is not sent to any remote server. This information is included in the descriptive model, which is discussed in more detail with reference to FIG. 5 below. People module 230 may generate information about the people in the environment. Only if the device owner and relevant users have expressly opted into sharing their information (e.g., social-networking information, various non-identifying mannerisms), the information about the people may include, their positions, how engaged they are with a current audio-video communication session (quantified as an "engagement metric," discussed below), a non-identifying color histogram of each person, their talking style (e.g., fast, slow), gestures a person makes, and other suitable information. People module 230 may generate information for the descriptive model, which is discussed in more detail with reference to FIG. 5 below. If the device owner and relevant users have opted into sharing their information (e.g., social-networking information, various non-identifying mannerisms), context module 240 may generate information about the context of a particular AV communication session, such as the date or time of the AV communication session, the room the AV communication session is occurring in, the number of participants in the AV communication session, the orientation of each intelligent communication device, or the relationship between AV communication session participants (e.g., spouses, coworkers, schoolmates). In particular embodiments, if the users have expressly opted in to sharing social-networking information, context module 240 may receive social-networking information about the users who are participating in the AV communication session from the social-networking system via the social-networking system interface 135.

In particular embodiments, an AV communication session may involve an intelligent communication device 130 and at least one other device, which may be another intelligent communication device 130 or any other communication device, such as a smartphone, laptop computer, tablet, or a VR device. During the AV communication session, each participating intelligent communication device may both (1) send audio and visual data to the other participating devices, and (2) receive audio and visual data from the other participating devices. Thus, each participating intelligent communication device may be both a sending device and a receiving device. As an example and not by way of limitation, an AV communication session may include four intelligent communication devices among four different users. Each of those devices may send audio and visual data to the other three devices and may receive audio and visual data from the other three devices. Although this disclosure uses the terms "sending device," "sending user," "receiving device," and "receiving user," this disclosure contemplates that each device and user is both a sender and a receiver, because in an AV communication session, all devices send and receive information.

Figure 3B:
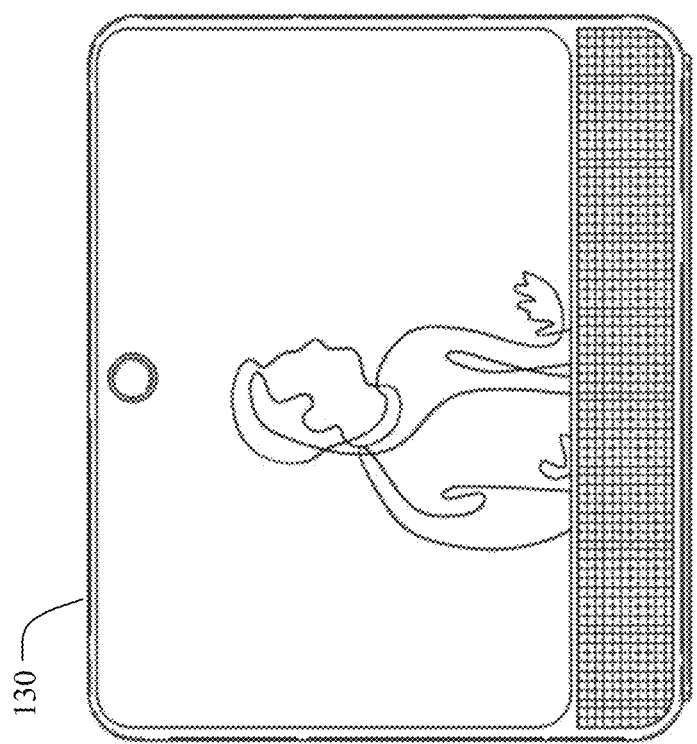
FIGS. 3A and 3B illustrate an example user interaction with an example intelligent communication device.
Figure 3A:
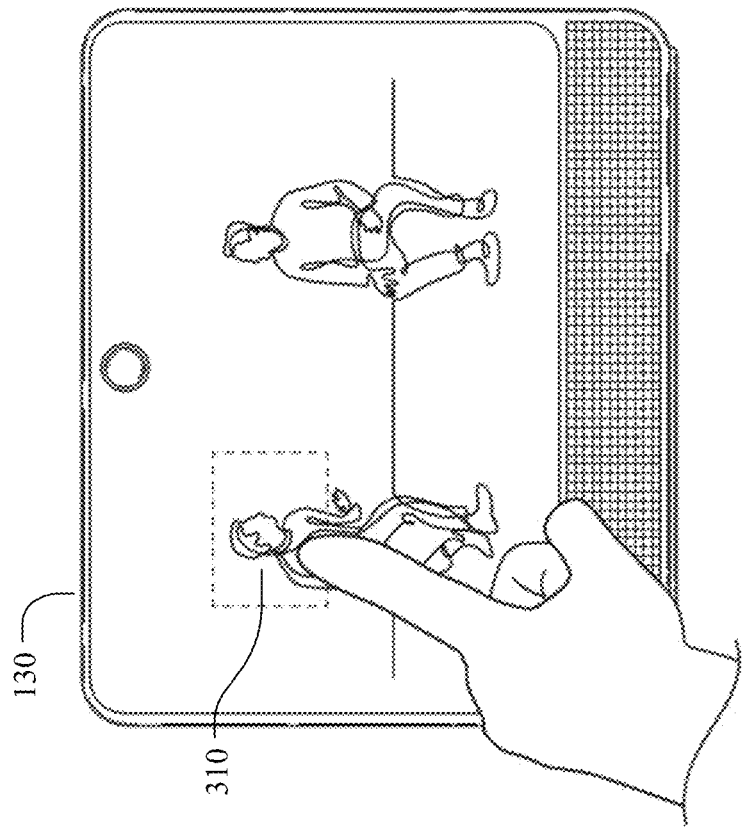

FIGS. 3A and 3B illustrate an example user interaction with an example intelligent communication device. In FIG. 3A, the intelligent communication device is displaying a scene with two people who are talking to each other and to a user participant associated with intelligent communication device 130. The intelligent communication device 130 allows the user to interact with it in various ways, including tapping on a particular object or person on the display screen and zoom in on that person or object. As an example and not by way of limitation, the user may tap somewhere inside box 310 if the user desires to zoom in on the person inside box 310. FIG. 3B illustrates what may result from a user tapping on box 310. After the user taps inside box 310, the intelligent communication device 130 may digitally zoom in on the space inside box 310. In particular embodiments, if a first user has expressly specified that he or she allows a "following feature," a second user may tap on the screen of the device at a location corresponding to the first user, and the second user's tap may cause the intelligent communication device to follow the second user as he moves around the environment while still maintaining a tight, zoomed-in view of the second user. The first user's tap may also cause the audio coming from the person to be amplified relative to other noises in the environment, if the second user has expressly opted in to allowing his or her voice to be amplified relative to other sounds.

Figure 4:
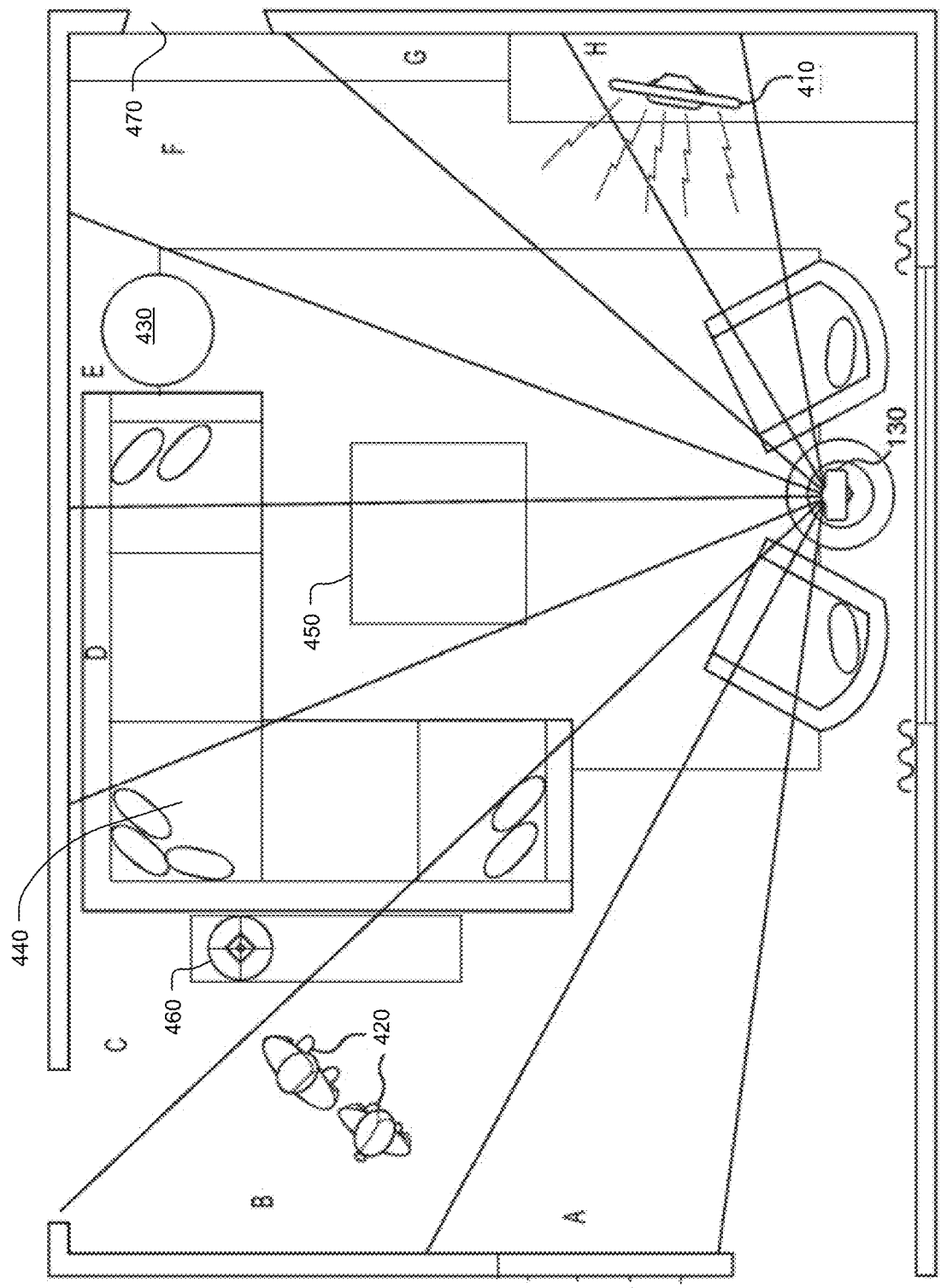
FIG. 4 illustrates an example visualization for visual and audio selection.

FIG. 4 illustrates an example visualization for visual and audio selection. In particular embodiments, the intelligent communication device 130 may divide its environment up into several "slices." In the example illustrated, there are eight slices A through H, but this disclosure contemplates any suitable number of slices. The smart audio component 131 may determine which slice each audio source is coming from. Likewise, the smart video component 133 may determine which slice each visual object is located in. As an example and not by way of limitation, two people 420 may be having a conversation in sound slice B and a television set 410 may be playing in sound slice H. Each of people 420 and television 410 may be emitting sound simultaneously. The smart audio component 131 may identify both sound sources and determine which slice they are currently located in. Likewise, the smart video component 133 may identify both visual objects and determine which slice they are currently located in. In particular embodiments, a sound source or a visual object may occupy more than one slice. For example, a person may be straddling slices C and D. In this case, the smart audio component and smart video component may be able to determine that the sound and visual object (e.g., person) may be located at the edge of slice C and slice D.

Figure 5:
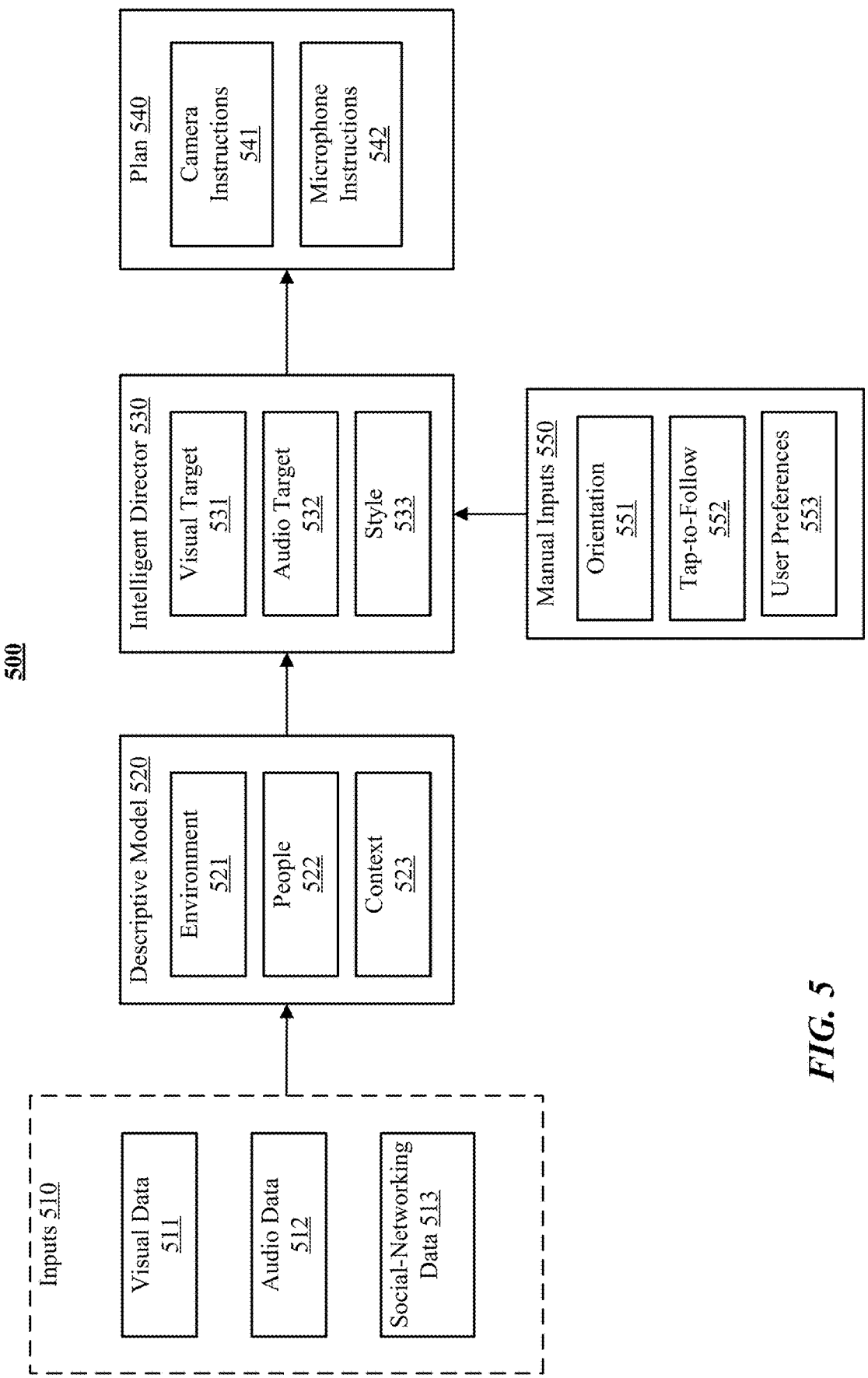
FIG. 5 illustrates an example block diagram of example inputs and decisions made by an example intelligent communication device.

FIG. 5 illustrates an example block diagram 500 of example inputs 510 and decisions made by an example intelligent communication device. In particular embodiments, the intelligent communication device 130 may access input data from one or more input sources. The input sources may be one or more cameras, one or more microphones, one or more metadata elements (e.g., the number of participants in either the sending or receiving environment), and one or more contextual elements associated with a current AV communication session. The camera(s) may provide visual data 511, the microphone(s) may provide audio data 512, and the contextual elements may come from social-networking data 513. In particular embodiments, the visual data 511 and the audio data 512 may be processed by one or more computing components on the intelligent communication device 130. In particular embodiments, the visual data may be 2D Pose data. 2D Pose data may include skeletons of the people in the environment. The 2D Pose data may be updated at a particular frame rate (e.g., 10 times per second). The intelligent director 132 may access the 2D Pose data at the frame rate (e.g., 10 times per second) and may instruct the camera components and audio components based on information obtained from the 2D Pose data. As an example, if the 2D Pose data indicates that a participant is moving to the left, the intelligent director 132 may instruct the camera components to pan the display to the left, to track the participant as she moves across the room. In particular embodiments, the 2D Pose data may be supplemented with inferences to make the frame rate appear faster. To make these inferences, the intelligent director 132 may extrapolate participants' trajectories to predict where they will be in the near future. For example, if a participant is currently moving to the left across the environment, it is likely that she will still be moving to the left one second from now. The intelligent director 132 may make a prediction about the participant's location and trajectory and may instruct the camera component accordingly. For example, if the intelligent director 132 predicts that the participant will be in location A and moving to the left with velocity B, it may instruct the camera component to pan to the left at a particular rate that is based on the current display, the participant's position, and the participant's velocity.

If the user has expressly opted in to 2D Pose body tracing, the 2D Pose data may provide a set of points that indicate where a person's body parts are located in the environment. If the user has expressly agreed to specific functionality in a privacy settings interface, the 2D Pose data may be detailed enough to provide points about where the user's eyes, mouth, chin, and ears are located. The intelligent director may use this data in a variety of ways. As an example and not by way of limitation, it may use the 2D Pose data to determine where a person is looking. The intelligent director may then be able to make cinematic decisions (e.g., where to direct the camera, how close to zoom the camera). For example, if three people are looking at a fourth person, the AI director may instruct the camera to zoom in on the fourth person. Processing of the visual data is discussed in more detail with reference to FIGS. 6 through 10 below.

In particular embodiments, the audio data 512 may be processed by the smart audio component 131. After being processed, the audio data 512 may include information about each sound source coming from the environment. This information may be (1) a direction that the sound is coming from relative to the intelligent communication device 130, and (2) a classification of the sound. As an example and not by way of limitation, a television set may be playing a basketball game. The smart audio component 131 may identify a sound source, classify it as television audio, and determine that it is coming from 25 degrees to the left of the intelligent communication device 130. The smart audio component 131 may then provide this information as audio data 512 to intelligent director 132. The intelligent director 132 may use this information to make decisions about the audio. For example, intelligent director 132 may dampen the television audio relative to other sounds in the environment so that a receiving participant may hear a sending participant's voice more clearly.

In particular embodiments, a computing component of the intelligent communication device 130 or a remote computing device associated with a social-networking system may generate a current descriptive model based on the input data. The current descriptive model may, subject to privacy settings of the device owner and each of the relevant users, include non-identifying descriptive characteristics (e.g., descriptive elements) about (1) the environment, (2) people within the environment, and (3) the context of the current AV communication session. The description of the environment that the intelligent communication device is currently located may be important for the intelligent director because the intelligent director may use the information to make cinematic decisions during the AV communication session. For example, if the intelligent director is aware that a wall exists at a particular location, it may instruct the camera to pan no farther than the wall, since no person would ever move past a solid wall. A metric related to the environment may be the dimensions of the environment.

Another metric may be the level and type of activity that is generally in the environment. For example, is the environment a room where lots of people walk through, like an entryway to a home? This type of information may be used by the intelligent director to determine how fast to pan, how close to zoom and crop individuals, or how often to cut between scenes or people. For example, if the environment is a room with high activity (e.g., a living room or entryway)_ the intelligent director may instruct the camera to zoom out to a larger than normal degree. Another piece of information may be lines that appear on walls, such as moldings or wall edges. These may be used in rendering to straighten curved lines. The camera lens may be a wide-angle lens that captures as much of the environment as possible. The resulting image may appear distorted or "fish-eye." This may cause straight lines to appear curved to the viewer. The intelligent director may provide instructions to straighten the image in rendering so that lines that appear straight in real life appear straight on the screen of the receiving intelligent communication device. Another metric may be the lighting in the room. For example, if the room is dark (e.g., brightness is below a pre-determined threshold level), the intelligent director may determine to brighten the room by increasing the exposure of the camera or to post-process the visual data and lighten the output video. Another metric may be the current color in the room. For example, a lamp may cast the room in an orange tint. The intelligent director may access this data and provide instructions to color-correct the room.

In particular embodiments, the current descriptive model may include non-identifying descriptive characteristics of people within the environment, as illustrated by people module 522. In particular embodiments, the descriptive characteristics may be non-identifying. The non-identifying characteristics may include a person's location, orientation, actions, engagement level, and "anchors." In particular embodiments, if the person has expressly opted in to sharing personal information, the descriptive characteristics may further include the person's social-networking information. In particular embodiments, the accessed information is erased or cleared after an AV communication session has ended. In such embodiments, the device does not store information about people from one communication session to the next. Again, in such embodiments, the person's identity is not determined or recorded, even temporarily. A person's location may be where they are located in the environment. The intelligent director may make cinematic decisions based on a person's location. For example, if the person is located far away from the intelligent communication device but is speaking, the intelligent director may make a determination to zoom in on the person. A person's orientation may also factor into the cinematic decisions of the intelligent director. For example, if a person is facing away from the intelligent communication device, the intelligent director may instruct the camera to focus elsewhere. The intelligent communication device 130 may determine which people in the room have opted in to sharing their social-networking information using facial or voice recognition, or any other suitable type of recognition. The device 130 initially accesses a privacy log that has been expressly configured by the user. It may do this without accessing the user's identity because unique identifying data associated with the user's face or voice is stored in association with the privacy log so that the system can determine which log to access, but the user's name and other personal information is not stored with the privacy log. Only when the user has expressly allowed the sharing of social networking information with the device 130 may the device access the social-networking information stored in the social graph. Here, information is only pulled from the social graph—no information about any user is sent by the device to any remote server or any other remote device. If no privacy settings exist for a particular person (e.g., because they are not a user of the social-networking system), the device will not perform access on the person. If a person appears frequently and/or prominently in an AV communication session, the intelligent director may determine that she is important to the other participants in the AV communication session. She may even be the owner of the intelligent communication device. Thus, the intelligent director may instruct the camera and microphone to focus on her more than other people in the room, who may appear less frequently or less prominently.

A person's actions may, subject to the privacy settings of the user, also factor into the cinematic decisions of the intelligent director. A person's actions may include the movements the person is currently making (e.g., is the person doing jumping jacks?), the person's facial expressions, the person's gestures, and also the style of a person's movements (e.g., does the person move around a lot? Does she use a lot of hand gestures when speaking?). The intelligent director may have rules based on movements the person is currently taking. Generally, if a person is active (e.g., moving quickly around the room, jumping, waving his arms), the intelligent director may determine to center the camera on the active person zoom out so that the person's movements may be seen without quick and jerky camera movements. If the person is inactive, the intelligent director may determine to zoom in on the person's face or upper torso and head. The intelligent director may also have rules based on the facial expressions a person makes. As an example and not by way of limitation, if the person is laughing, the intelligent director may provide instructions to cut to that person and do a close crop of her face or upper torso and head so that the viewer may see the person laughing. The intelligent director may also have rules based on the gestures a person makes. Gestures may include anything from a hand wave, to a hug, to a head nod, to chopping vegetables in the kitchen. Depending on the gesture, the intelligent director may instruct the camera to do different things. For example, a hand wave or a hug may cause the intelligent director to instruct the camera to cut to the person waving his hand or hugging another person. But a gesture of chopping vegetables may cause the intelligent director to provide instructions to zoom in on the person's hands. So far, this discussion has focused on the actions of a participant who is sending visual data to a receiving participant. But the intelligent communication device may also take into consideration the actions (e.g., facial gestures) of the receiving user, if the receiving user has allowed the device to monitor facial expressions. As an example and not by way of limitation, a first participant, Alice, may be having an AV communication session with a friend, Betsy, and Betsy's friend, Caroline. When Caroline comes into view on Alice's smart communication device, Alice may smile and say something like "Hi Caroline! It's so nice to see you!" Alice's smart communication device may pick up on this reaction from Alice and store this as an increased affinity for Caroline during the duration of the communication session, but not for future communication sessions. As a result, the intelligent director may personalize the cinematic decisions for Alice, and may thus provide instructions to focus the camera more on Caroline than on other people or objects.

In particular embodiments, a person's engagement level may factor into the decisions made by the intelligent director. In particular embodiments, only if the relevant users have opted in to sharing their social-networking data, one or more processors associated with the intelligent communication device may calculate an engagement metric for each person or object (hereafter referred to as "subject") in the environment in which the sending device is located. The engagement metric may approximate an interest level of a receiving user for the associated subject, given the receiving user has opted in to allowing the device to access her social-networking data. Examples of objects include television sets, pets, toys, art, and the like. Generally, objects may have a very low engagement metric because participating users may be primarily interested in communicating with other people and not viewing or listening to objects. The engagement metric I of the receiving user for a given subject i may be calculated by using the formula $I_x = Ax + By + \ldots Cz$, where A, B, C are the features associated with the subject and x, y, z are weights that may be assigned to each respective feature. As an example and not by way of limitation, feature A may be a classification of the subject as described by the smart video component 133 or the smart audio component 131, or a combination of the two. If the the subject is a human, A may be assigned a feature value of 1. If the subject is non-human (e.g., a pet or a television), A may be assigned a value of 0. The weight, x, assigned to A, may be any suitable weight. For example, the weight may be some value between 0 and 1. As a general rule, the more important the feature, the higher the weight may be. It is likely that the subject classification may be an important feature because the receiving user may almost always be more interested in communicating with a human than a non-human. Thus, x may be assigned a heavy weight relative to the other weights. For example, x may be assigned a weight of 0.75.

In particular embodiments, the only feature in the engagement metric calculation may be the classification of the subject. Thus, in particular embodiments, the formula used by the intelligent director to calculate the engagement metric may be $I_i = Ax$. As an example and not by way of limitation, a user, Ally, may be having a video chat with her mom, Betsy, using the intelligent communication device. Ally may be the sending user and Betsy may be the receiving user. Note that both users are both sending and receiving users (as information is both sent and received during an audio-video communication session) but for the purposes of this discussion, Ally may be the sending user and Betsy may be the receiving user. There may also be a dog with Ally. The dog may be moving around and barking or making other noises. The intelligent director may determine two engagement metrics: one for Ally, and one for Ally's dog. To make the determination, the intelligent director may first classify each subject using visual data 511 or audio data 512, and may classify Ally as a human and Ally's dog as a non-human. The intelligent director may then calculate the engagement metric for Ally as being 0.75 (assuming x=0.75) and the engagement metric for the dog may be 0, (since A would have been assigned a 0 for the dog). As a result, the intelligent director may provide instructions to focus the camera and microphones on Ally and ignore the dog, even when it barks and makes other movements. Note that in particular embodiments, this decision may be overridden if the participants' actions deem it appropriate to override the intelligent director's decisions. For example, if the participants start looking at and laughing at the dog because it is doing something funny (e.g., performing a trick), the intelligent director may provide instructions to pan away from Ally and toward the dog.

In particular embodiments, other features may include the distance between the intelligent communication device 130 and the subject (with smaller distances being assigned a greater feature value), the location of the subject relative to the intelligent communication device 130 (with sounds located in front of device 130 being assigned a greater weight), the social graph distance affinity score, only if the relevant users have opted in to sharing their social-networking data, between users on either end of the video chat (with greater affinity scores being assigned a greater weight), the amount of time a person has been present in the environment during the audio-video communication session, the number of words a person has spoken during the audio-video communication session, only if the relevant users have opted in to sharing such information, a length of time during which a participant has made eye contact with an intelligent communication device, and contextual clues. For example, if a majority of people in the room are looking toward the right side of the room, that may indicate that something interesting is happening at that part of the room. If there is a subject at that part of the room, that subject may be interesting as well. Thus, the engagement metric may be adjusted for that subject accordingly. A binary question to ask in this regard may be "is the gaze of at least half the people in the environment directed toward the subject?" If the answer is yes, then the intelligent director may assign that feature a 1. Another example of a context clue may be a receiving user's facial expression, only if the receiving user has expressly opted in to the system using facial expressions to enhance the user experience, while a particular subject is in view, as discussed previously. As another example and not by way of limitation, two users, Ally and Betsy, are having a video chat with the intelligent communication device 130. Ally may be the sending user and Betsy may be the receiving user. Assume that Betsy has previously consented (via, e.g., a privacy settings interface) to the system using her facial expressions to enhance her user experience during AV communication sessions. The smart video component 132 may register facial expressions of Betsy or may simply register where Betsy looks while various subjects come into view on Betsy's intelligent communication device. For example, Ally and Betsy may be having a conversation, and Ally's husband may enter the environment and interrupt the conversation to ask Ally a question. While Ally's husband is speaking, Betsy may look away from the intelligent communication device 130 to check her phone or tend to some other task. This looking away may indicate that Betsy is not particularly interested in what Ally's husband has to say. Thus, this may be an indication to the system to dampen the audio coming from Ally's husband and maintain the camera center on Ally unless Ally's husband is actually participating in the conversation, as may be determined by other metrics, such as whether Ally looks at her husband while he is speaking, the amount with which Ally's husband speaks, the volume of his speech, the distance between Ally's husband and the intelligent communication device 130, or any other suitable metric.

As another example of how an engagement metric is calculated, consider an AV communication session where in a first environment there are two subjects: a participant Alex, and a television that is playing an NCAA basketball game between Ohio State and Michigan. In a second environment is a participant Becky. Assume that Alex and Becky have both previously and independently consented (via, e.g., a privacy settings interface) to the system using their social-networking data to enhance their user experience during AV communication sessions. The intelligent director may calculate two engagement metrics that approximate Becky's interest in the two subjects of the first environment: a first engagement metric for Alex and a second engagement metric for the television. The engagement metric calculation may consider three features: (1) class of subject; (2) social graph affinity between Becky and the subject; and (3) location of subject relative to the intelligent communication device 130. The above features may be weighted 0.75, 0.50, and 0.25 respectively. For the purposes of this example calculation, assume that: (1) Alex and Becky are in a relationship; (2) Becky's social graph indicates that she attended Michigan for college; and (3) Alex is located closer to the intelligent communication device 130 than the television. The engagement metric for Becky's interest in Alex may be expressed as $I_A=Ax+By+Cz$, and the engagement metric for Becky's interest in the television may be expressed as $I_T=Ax+By+Cz$. Thus, Becky's interest in Alex may be $I_A=(1)(0.75)+(1)(0.50)+(1)(0.25)=1.5$. This may be because Alex is classified as a human and thus the intelligent director may have assigned feature "A" a score of 1. Also, since Becky and Alex are in a relationship they likely have a strong social graph affinity for one another, so "B" may also receive a score of 1. And since Alex is located close to the intelligent communication device 130 (e.g., within a threshold distance), "C" may also receive a score of 1. For the television set, the engagement metric may be calculated as $I_T=(0)(0.75)+(1)(0.50)+(0)(0.25)=0.5$. This may be because the television is not classified as a human, so A may be assigned "0." Since Becky attended Michigan University and there is a Michigan game playing on the television, Becky may have a strong affinity (e.g., above a threshold affinity) for Michigan Basketball. Thus, B may be assigned "1." The intelligent director may have determined that a Michigan basketball came was playing on the television either through image/audio recognition or by accessing an online television guide. Note that the intelligent director determines that Michigan Basketball was playing if the device owner expressly authorized the intelligent communication device to retrieve information from the Internet on the owner's behalf. Lastly, since the television is located outside the threshold distance, C may be assigned "0." Therefore, the engagement metric for Alex may be higher than the engagement metric for the television. As a result, the intelligent director may provide instructions to center the camera on Alex and to follow Alex around the room and to dampen the television sound relative to Alex's voice.

In particular embodiments, the intelligent director may increase the engagement metric for a subject based on information included in a social graph associated with the receiving user. As discussed below, the social graph may include nodes and edges connecting the nodes. Each edge connecting two nodes may represent a relationship between the two nodes. For example, if a first user, Alex, attended college at Baylor University, the social graph may have a first node corresponding to Alex (or to Alex's profile on the online social network) and a second node corresponding Baylor University (or to an online resource for Baylor University). The social graph may additionally have an edge connection between the first node and the second node. The edge connection may have an edge type. The edge type may be "attended." Additionally, there may be other edges between Alex's node and the node for Baylor University, if Alex has performed other actions on the online social network with regard to Baylor University. For example, Alex may have liked the Baylor University entity page on the online social network. This may have generated another edge connection with an edge type of "like" between the first node and the second node. Watching videos associated with Baylor University, commenting, joining groups, and other similar actions may all add edge connections between Alex's node and the node for Baylor University. These actions may also serve to increase an affinity coefficient between Alex and Baylor University, as is discussed below. Assume that Alex has previously consented (via, e.g., a privacy settings interface) to the system using his social-networking data to enhance his user experience during AV communication sessions. The intelligent director may access the social graph according to Alex's privacy settings (as discussed in more detail below) and may increase the engagement metric based on the affinity or edge between the user and a given entity. To continue the above example, Alex may be participating in a video chat with another user such as people 420 of FIG. 4. The television 410 may be playing a Baylor Football game. The smart audio component 131 may have determined that a Baylor Football game is playing on television 410 by recognizing sounds (e.g., the TV may play the words "welcome back to Baylor Football"), or by accessing a television guide and the current channel of the television, or by any other suitable means. The smart audio component 131 may access a social graph for Alex and may determine that a high affinity coefficient exists between Alex and Baylor University, and specifically, for Baylor Football. Based on this determination, the intelligent director may increase the engagement metric for the television, because it is more likely that Alex would be interested in watching the football game.

In particular embodiments, a person may be associated with an "anchor." An anchor may be a point on the person's body that the person does not deviate from. As an example and not by way of limitation, if a person is standing, the person's anchor may be located at the feet, or lower torso. This is because it is unlikely that the anchor will move, even though the person may move her arms, or bend at the waist, or move her head. Anchors are used to determine how much to pan the camera in order to follow a subject. It is generally undesirable to have too much movement in a camera shot. A viewing participant may want little movement or smooth movement. By anchoring the camera shot to a spot on the person's body that is unlikely to move, the intelligent director may ensure that the camera shot moves as little as possible. To understand this more fully, imagine if the anchor were on the person's hand. Every time the person moved her hand, the camera shot would follow. This may become very annoying to a viewing participant. Therefore, the anchor may be lower on the person's body, such as feet or hips. If the camera is centered on a particular subject, the intelligent director may provide instructions for the camera to move only when the anchor moves. Each subject may have an anchor. The anchor may be determined from the 2D Pose data either before it is sent to the intelligent director or afterwards.

In particular embodiments, the context of the AV communication session may be included in the current descriptive model. Context may be any information about the AV communication session, such as the date, the time, or events surrounding the date and time of the AV communication session. The intelligent communication device 130 accesses the relevant users' privacy settings and determine if any of the users has expressly opted in to sharing their social-networking data with the intelligent communication device 130. If so, the intelligent director 132 may use such information to enhance the users' experience during an AV communication session. As an example and not by way of limitation, the AV communication session may occur on a participant's birthday. A participant named Jordan may be turning 28 years old on the day of the AV communication session. The intelligent communication device 130 may access this information via the social-networking system interface component 135. The intelligent director may decide to instruct the camera to follow Jordan or to cut the scene to Jordan more often during the AV communication session, since it is likely that the other participants (e.g., grandparents, friends) may be more interested in communicating and seeing Jordan on Jordan's birthday than the other participants in Jordan's environment.

In particular embodiments, the intelligent director may use the information in the current descriptive model to identify one or more visual targets 531, one or more audio targets 532, or one or more styles 533. Visual targets 531 may be any suitable subject that the intelligent director decides is worthy of following as discussed herein. As an example and not by way of limitation, Jordan from the above example may be a visual target. The visual target may change quickly from person to person during an AV communication session. For example, each person who talks may be a visual target while he or she is speaking. In particular embodiments, the visual target need not be tightly coupled to the audio target 533. The intelligent communication device 130 may de-couple the audio from the video. This may allow a receiving user to view one object and listen to a different sound source. As an example and not by way of limitation, the receiving user in the above example may be able to listen to the conversation happening in slice B of FIG. 4 (given that all of the users participating in the conversation have previously opted in to allowing the intelligent communication device 130 to amplify their conversations) but may be able to watch the game that is on television 410 in slice H. The user may be able to select to view this through any suitable user settings configuration, including voice commands. The intelligent communication device 130 may also be able to infer the user's desire to view one object and listen to a different sound source. This may be accomplished using any suitable means, including user preference settings. For example, an icon for video and an icon for audio may be provided. The user may select video and tap on a subject to be the video target. The user may then select audio and tap on a different subject to be the audio target. This may work well with a user who wants to view a particular subject but talk to a different subject. In particular embodiments, the intelligent director may decide to instruct the camera and microphone according to a particular style. The style may be as simple as fast camera movements and cuts versus slow camera movements and cuts. With fast movements, the camera may move around rapidly and respond very quickly to different movements and sounds. With slow movements, the camera may take a more leisurely approach and move between subjects slowly. In particular embodiments, the style may be adopted from a particular Hollywood director. For example, the intelligent director may make decisions that mimic the directing style of Quentin Tarantino, Stanley Kubrick, or Wes Anderson.

Generally, the intelligent communication device 130 does not store information gathered during a given AV communication session for use in future communication sessions or for any other purpose. This may serve to protect the participants' privacy and personal information. In particular embodiments, a user or group of users may wish to have their information stored locally on the device 130 and used during future communication sessions. Storing information for future use may save computing resources and also provide an enhanced user experience. Such data is not sent to any remote device. It is only stored locally on the device 130. In particular embodiments, the device 130 may generate a historical descriptive model that is based on past AV communication sessions that have occurred within the environment. The intelligent director may access the historical descriptive model when it makes its decisions. The historical descriptive model may be formed by prior descriptive models that were generated during previous AV communication sessions. This may save computing resources because the intelligent director may simply access the historical descriptive model to make decisions. This may mean that the current descriptive model may include some descriptive elements taken from prior descriptive models. For example, instead of determining dimension estimates of the room for every AV communication session, the current descriptive model may use the dimensions from a prior AV communication session. This may save time because it may be faster to access stored information (e.g., room dimensions) than it is to calculate new information.

In particular embodiments, the intelligent director may make cinematic decisions based on one or more manual inputs 550 entered by either the receiving participant or the sending participant. In particular embodiments, manual inputs entered by participants may override any decisions made by the intelligent director. In particular embodiments, the inputs a participant may enter into the system may include the orientation of the display screen of the intelligent communication device (e.g., portrait or landscape), a tap-to-follow command, and various user preferences. Based on the orientation of the display screen, the intelligent director may make different cinematic decisions. For example, if the display screen is oriented in landscape mode, the intelligent director may instruct the camera to leave space in front of the subject's face, so that the subject is located in the back third of the display screen. If the display screen is oriented in portrait mode, the intelligent director may instruct the camera to position the subject's face in the top third of the display screen. These are just examples; this disclosure contemplates any suitable decisions that are based at least in part on the orientation of the display screen. A user may also tap on a subject to follow that subject, given that the subject has previously opted in to allowing the device 130 to zoom in on him and pan with him as he moves around the environment. The default mode for the intelligent communication device may be a group viewing mode, where most of the subjects are within the viewing space of the display screen. If a participant taps on a particular subject, the display screen may zoom in on that subject so that the participant sees a close-up of the subject, again, given that the subject has previously opted in to this feature. A participant may also set various privacy preferences. For example, a participant may specify that the intelligent communication device never send visual data of the participant's bathroom (which may be visible by the intelligent communication device). As another example, a participant may specify that the intelligent director never identify her using social-networking data or by any other means. The participant may elect to block the social-networking system interface 135 from accessing information related to the user on the social graph. As another example and not by way of limitation, a user may set privacy preferences with the online social network that will be followed by the intelligent communication device. For example, a user may specify via the online social network that she does not want any intelligent communication device to access her social graph information. The user may then go to her friend's house who has an intelligent communication device and they may participate in an AV communication session with another participant. The intelligent communication device may identify the user and access her privacy settings on the online social network to determine whether it has permission to access the user's social graph. If permission is not granted, the intelligent communication device will not access the user's social-networking information.

Once the intelligent director 530 has accessed the information in the descriptive model 520, it may generate a plan 540 for the camera and microphone to follow. The plan may include camera instructions 541 and microphone instructions 542. The camera instructions may be any suitable instructions for a camera, such as instructions to zoom in on a subject, zoom out, pan, center the camera at a particular location, cut to a different scene within the environment, smooth or jerky movements, or any other suitable action. The microphone instructions may be any suitable microphone instructions, including instructions to dampen a particular sound relative to other sounds, amplify a particular sound relative to other sounds, or any other suitable instruction.

Figure 6:
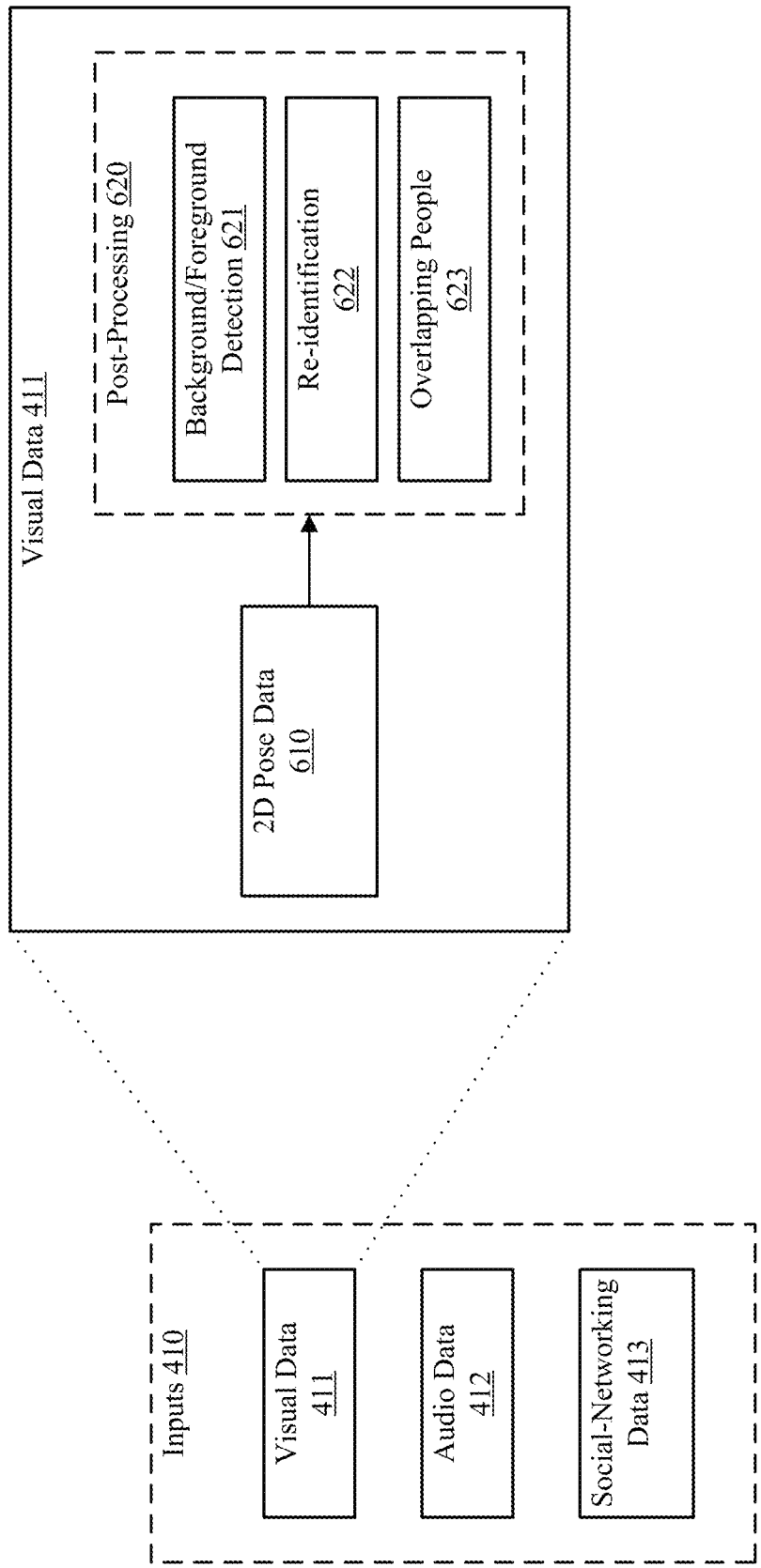
FIG. 6 illustrates an example block diagram for visual data associated with an example intelligent communication device.

FIG. 6 illustrates an example block diagram for visual data associated with an example intelligent communication device. The visual data may comprise 2D Pose Data 610 and one or more types of post-processing data 620. 2D Pose data 610 may be data that represents the two-dimensional location of a person in the environment. It may include, for each person in the environment, a set of points that correspond to a plurality of surface points of the person. For example, the set of points may indicate the major body parts of the person. For example, the 2D Pose data may include 19 x,y coordinates for each of the following body parts: top of head, chin, left ear, right ear, left eye, right eye, nose, left shoulder, right shoulder, left hip, right hip, left elbow, right elbow, left hand, right hand, left knee, right knee, left foot, and right foot. The set of points may make up what is referred to herein as a "human skeleton." Two examples of human skeletons are illustrated within the bounding boxes 720 of FIG. 7. In addition to the set of points, the 2D Pose data may also include a bounding box that encompasses the set of points. The bounding box may be large enough to contain all the point in the point set. More information about 2D Pose data may be found in U.S. application Ser. No. 15/922,734, titled "Object Instance Segmentation," filed 15 Mar. 2018, which is incorporated herein by reference. In particular embodiments, one or more processors on the intelligent computing device 130 (or, alternatively of a remote server associated with an online social-networking system) may process the 2D Pose data for use by the intelligent director. Three types of processing include background/foreground detection 621, re-identification 622, and overlapping people 623. The process by which background/foreground detection is accomplished is discussed below with reference to FIG. 7. The process by which re-identification is accomplished is discussed below with reference to FIG. 8. The process by which overlapping people are handled is discussed below with reference to FIGS. 9 and 10.

Figure 7:
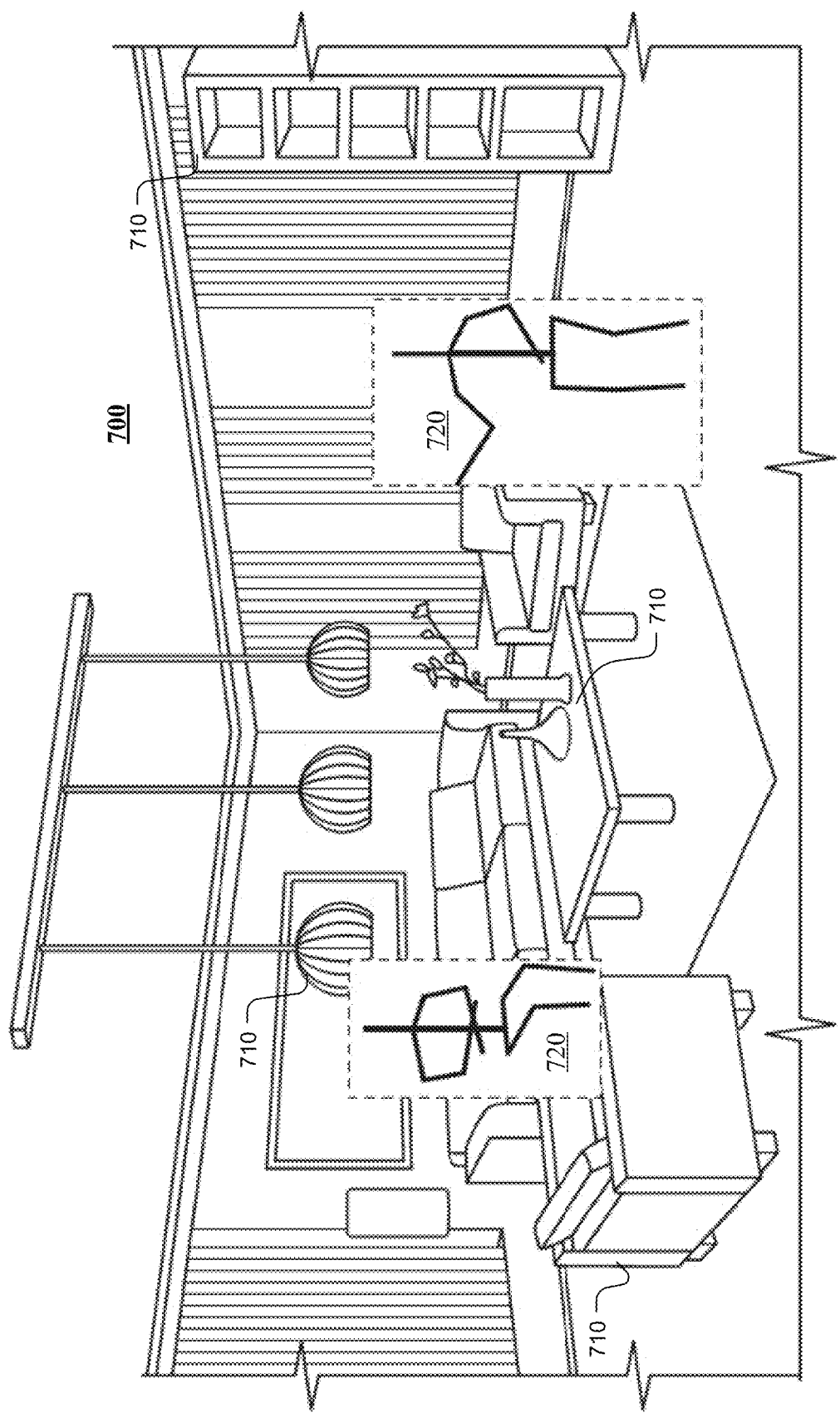
FIG. 7 illustrates an example visualization for performing foreground/background modelling by the intelligent communication device.

FIG. 7 illustrates an example visualization 700 for performing foreground/background modelling by the intelligent communication device. The example visualization 700 may comprise a representation of an environment that an intelligent computing device may be located in. The representation of the environment may include background objects 710 as well as representations of people located in bounding boxes 720. The background objects may include furniture, walls, bookshelves, tables, chairs, carpeting, ceilings, chandeliers, and any other object that remains in the environment without moving. The intelligent director may need to distinguish between foreground and background in order to make appropriate cinematic decisions. Traditional background modeling may use periodic color and pixel information to determine what in the environment is background and what in the environment is foreground. If some of the pixels periodically move (e.g change color or intensity), it may be determined that those pixels are part of the foreground. If some pixels remain unchanged for a threshold period of time, the traditional methods may determine that those pixels are part of the background. However, this method causes problems when pixels that should be foreground pixels remain unchanged for extended period of time, due to object not moving, and thus "fade" into the background. The traditional method may mistake pixels that should properly be foreground as background. For example, if a person moves into the environment, the traditional method may initially categorize the person's corresponding pixels as foreground. This is appropriate. But the person may lay down on the couch and take a three hour nap. Eventually, the person will remain unmoving for long enough that the traditional method will categorize the pixels corresponding to the person as background. This is a mistake and may lead to erroneous decisions by the intelligent director. A similar problem may arise if a person remains unmoving for several minutes during a video chat. This may also lead to erroneous decisions by the intelligent director. For example, the intelligent director may not recognize that a person who has been stationary for a long time is still participating in an AV communication session, and may erroneously provide instructions to pan away from the person.

To avoid the above situations, the intelligent director may combine background modeling with 2D Pose data. A background generator may gather background data on all parts of the environment except for the locations that people are located in. The intelligent director may provide the background generator with the locations of each person in the environment. The intelligent director may obtain this information from the 2D pose data. The intelligent director or another component may generate a bounding box (e.g., bounding box 720) that surrounds the 2D pose data for each person. The bounding box 720 may be created for each individual in the environment. The intelligent director may be able to differentiate between animate objects (e.g., people, animals) and inanimate objects (e.g., photographs, coat racks, wall art) by measuring the movement each object makes. Generally speaking, animate objects will move much more than inanimate objects. The intelligent director may monitor each object's movement, and if an object moves more than a threshold amount, the object may be classified as animate. Or in particular embodiments, may be classified as a person, given its associated 2D Pose data is consistent with that of a person. Even if the object is only moving a little bit, this may be sufficient to classify the object as a person. For example, if someone is sleeping on the couch, his only movement may be the rise and fall of his chest as he breathers. The intelligent director may detect this and may determine that the object is a person. The intelligent director may provide instructions to gather and update background data for all points in the environment except for the areas of the bounding boxes. The old background information for bounding box regions therefore remains unchanged. This is why bounding boxes 720 in FIG. 7 show no background—this is to illustrate that no new background information is gathered about the area inside the bounding boxes—old data from previous frames may still be kept. The background 700 may be initialized with static. Static may comprise pixels that have non-uniform values e.g. for RGB images this would mean non-uniform (red, green, blue) values. This disclosure contemplates both inter-pixel and intra-pixel non-uniformity. As an example and not by way of limitation, this disclosure contemplates two adjacent pixels with RGB values of either (0, 50, 150), (0, 50, 150) or (50, 50, 50), (100, 100, 100). In other embodiments, the color space may be grayscale or HSV etc. However, for the purposes of simplicity in the drawings, bounding boxes 720 show white pixels. In particular embodiments, each pixel corresponds to a particular location within the environment. Each pixel may have an x,y coordinate value that is different from every other pixel. For example, the pixel at the bottom-left corner of the rendering of the environment may have an x, y coordinate value of (0,0). Each pixel may also have a particular RGB color value. For example, a white pixel may have an RGB color value of 255, 255, 255. A black pixel may have an RGB color value of 0, 0, 0. A green pixel may have an RGB color value of 0, 255, 0. An orange pixel may have an RGB color value of 255, 128, 0.

In particular embodiments, gathering background data may mean that the RGB color value for the pixels associated with background elements (e.g., chairs, ceiling, floor, chandeliers, etc.) are recorded and tagged as background. In particular embodiments, depth information may additionally be gathered. Thus, each pixel may have an RGB value as well as a D (for depth) value. This may aid the intelligent director in determining which pixels represent foreground and which pixels represent background, given that pixels corresponding to objects closer to the device are more likely to be foreground and objects farther away from the device are more likely to be background. Gathering background visual data in this manner may serve two purposes. First, the RGB color values may be compared to historical RGB color values of the environment for lighting and color correction purposes. For example, if the RGB color values indicate there is an orange tint in the room, the intelligent director may provide instructions to color-correct the rendered image on the receiving intelligent communication device. Second, the visual data tagged as background data will be used to distinguish the foreground (e.g., the people) from the background. As the people in the environment move around in the environment, the bounding boxes 720 may move along with the people, and the tag of foreground may remain with the bounding boxes 720 until the people move out of the environment. Thus, when a person moves out of one the area of the image, the background generator may begin collecting background information about the recently vacated area. In particular embodiments, the set of coordinate points is updated periodically (e.g., 30 times per second), so that the movements of the people may be tracked using the 2D Pose data. This may cause the positioning of the set of points to change as the people move in the room. The bounding boxes 720 may also move around the room with the human skeletons. Although this disclosure discusses operating within the RGB color space, this disclosure encompasses any appropriate color space.

In particular embodiments, the background generator may track variation in color and/or intensity of pixels over time. If the intelligent communication device is moved (rotated or translated), the pixels in camera image may no longer have a 1:1 correspondence with the information stored in the background/foreground model. Thus, the background generator may detect a large change in pixel color and/or intensity of corresponding pixels. This may pose a problem since the background and foreground has not actually changed—only the perceived lighting of the room has changed due to movement of the intelligent communication device. In another situation, turning on or off the room lights may lead to a large difference in the incoming pixels of the camera image when compared to the pixels that are already stored in the background/foreground model. Thus all pixels may be considered to be "moving" and tagged as foreground. To overcome these issues, in particular embodiments, the intelligent communication device 130 may detect such events (device rotation/translation or big illumination changes) using sensors installed on the device. In particular embodiments, the device 130 may detect device rotation/translation or major illumination changes simply by detecting that all or nearly all of the pixels have changed from one frame to the next. As an example and not by way of limitation, at a first moment during an AV communication session, 40% of the pixels may be tagged as foreground and 60% of the pixels may be tagged as background. At a second moment during the AV communication session, the device 130 may detect that 100% of the pixels may be tagged as foreground. Such a large change in foreground pixels be highly unlikely to happen without the device 130 being moved or a large illumination change (e.g., turning on or off the lights in the room). Thus, whenever a threshold number or proportion of pixels shifts from background to foreground, the device 130 may determine that a global event has occurred (e.g., the device 130 has been moved, the lighting in the environment as changed significantly).

When the global event is detected, the intelligent communication device 130 may trigger a reset of the background/foreground modelling process. This will allow the background generator to relearn the environment. In particular embodiments, the reset of model may entail replacing the old background information with randomized static RBG pixel data. The incoming camera pixels thereafter may be used to update the background model and compare to the newly learned background/foreground model. This way the old background information does not influence the decision of which pixel is considered background or foreground.

In particular embodiments, during an AV communication session, a participant may tap on the display screen to indicate that the participant would like to zoom in on another participant or object (e.g., a pet) in the AV communication session. In response, the intelligent director may provide instructions to crop out some of the pixels that have been tagged as background. Pixels that are tagged as background may not be very interesting to a participant, so the intelligent director may be more likely to provide instructions to crop out background pixels.

Figure 8:
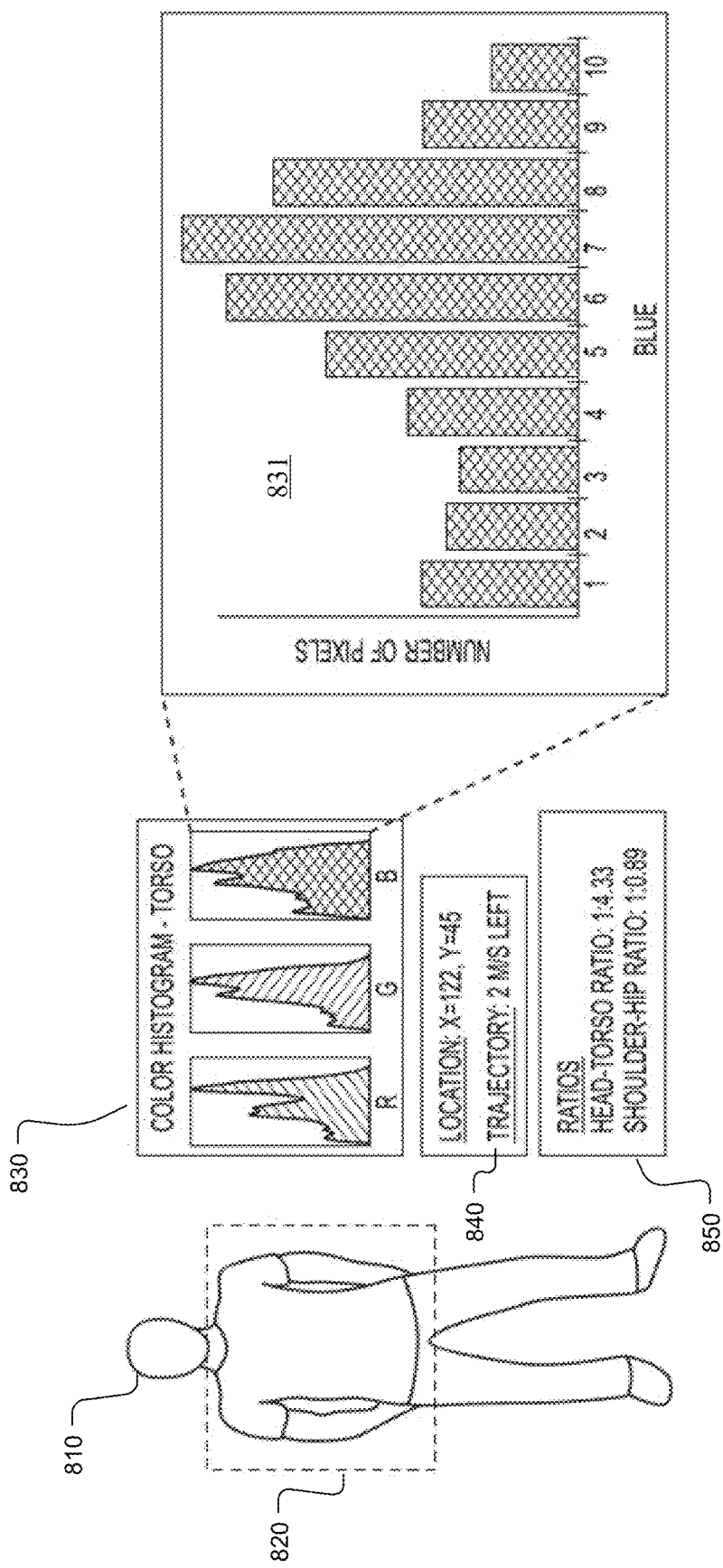
FIG. 8 illustrates an example visualization for reidentifying people by the intelligent communication device.

FIG. 8 illustrates an example visualization for re-identifying people by the intelligent communication device. The visualization may include an example person 810 with example torso region 820, example color histogram 830, example location and trajectory box 840, and example ratio box 850. In particular embodiments, at a first time during an audio-communication session, processors associated with the intelligent communication device or with a remote server may determine that a first participant is located within an environment of the intelligent communication device. For example, the processor may determine that a participant 810 is within the environment. The processor may locate a first body region (e.g., torso region 820). The processor may also generate a first color histogram for the first body region. The color histogram may be a representation of the distribution of colors in an image. For digital images, a color histogram represents the number of pixels that have colors in each of a fixed list of color ranges, that span the image's color space, the set of all possible colors. For example, the color histogram may be color histogram 830. The color histogram may indicate how many red, green, blue (RGB) pixels are in the body region. The color histogram may be divided into several pixel buckets, where each column represents pixels that span part of the RGB range of color (e.g., 0-255). For example, the columns labeled 1-10 in histogram 531 may each represent the blue pixels in different ranges of colors (e.g., 0-25, 26-50, etc). The processor may determine each pixel's value and assign it to the appropriate column. This may be done separately for each RBG channel, as shown by histogram 830. Each participant may have a unique but non-identifying color histogram and the intelligent director may be able to keep track of participants by referring to their respective color histograms. In particular embodiments, the intelligent director may not identify the participant by name but may simply use the color histogram of each participant to keep track of the participants. This way, the intelligent director will not mistake one participant for another participant in the same AV communication session.

In particular embodiments, the processor may locate a second body region of the second participant that is the same as the first body region (e.g., the torso region). The processor may generate a second color histogram of the second body region, wherein the second color histogram represents a second distribution of one or more colors of the second body region. The processor may then compare the first color histogram to the second color histogram. Since no two color histograms will be exactly the same for two different people, if the processor determines that the two color histograms are the same, the processor may determine that both color histograms represent the same person. In particular embodiments, the processor may generate a new color histogram for all participants at regular intervals (e.g., 10 color histograms per second per participant).

In particular embodiments, the processor may, if any relevant user has expressly opted into this feature, also determine one or more ratios associated with the participant. Each participant may have unique body proportions relative to other users in the environment in which the device 130 is located. Thus, the processors may use these body proportions to keep track of participants in a similar manner that it uses the color histograms in a non-identifying manner. Example body proportions are provided in ratio box 840. This disclosure contemplates any suitable body ratio. Additionally, the processor may determine a current location and current trajectory of a participant. These metrics may be used to keep track of participants. For example, if a first participant is located at position x at a first time and is moving to the left, it is highly unlikely that the same participant will be located to the right of position x immediately after the first timeframe. If the processor detects a second participant to the right of position x immediately after the first timeframe, it may determine that the second participant is different from the first participant.

In particular embodiments, the device 130 may perform non-identifying facial recognition to keep track of participants in the environment. This may be referred to as anonymous local face recognition—because the participants are not actually identified, and no data is transferred to a remote server. As an example and not by way of limitation, the device 130 may determine that two participants are located in the environment. Device 130 may not identify these participants by name but may instead use pseudonyms to keep track of them. For example, it may label the first participant "User A" and label they second participant "User B." User A and User B may each have their own mannerisms and style of speaking and moving that may cause the intelligent director 132 to make different cinematic decisions for each user. Thus, it may be important to keep track of which participant is User A and which participant is User B. If User A crosses over the path of User B, the intelligent director 132 may mistakenly swap the labels for these two participants. To correct for this, the intelligent director 132 may access a facial recognition engine to determine which participant is User A and which is User B. This may require the device 130 to locally store their facial profile at the beginning of the AV communication session. The above functionality may be applied if one of the participants briefly leaves the environment and then re-enters the environment (e.g., re-enters after leaving for five minutes). The system may quickly recognize that the participant has been previously labeled (e.g., from their color histogram, facial profile, and/or ratios, the system may determine that the participant is "User A"), and may be able to retrieve previously stored data associated with the participant. In particular embodiments, the stored data for any participant may be erased after the participant has left the AV communication session for a threshold amount of time (e.g., has left the room for more than five minutes).

In particular embodiments, the processor may assign weights to each of these elements: the color histogram, the ratio metric, and the current location and trajectory metric. The elements may be weighted differently according to the dictates of a system administrator. The weights and elements may be used to calculate a re-identification score for each participant. The re-identification score may be a likelihood that the participant is a particular participant that was determined previously. For example, the system may identify a first participant and label her participant A. A short time later, the system may identify a second participant and label her participant B. The system may then compare the re-identification scores of participants A and B, and if they are within a threshold range, the processor may determine that participant B is actually participant A (i.e., they are the same person).

Figure 9:
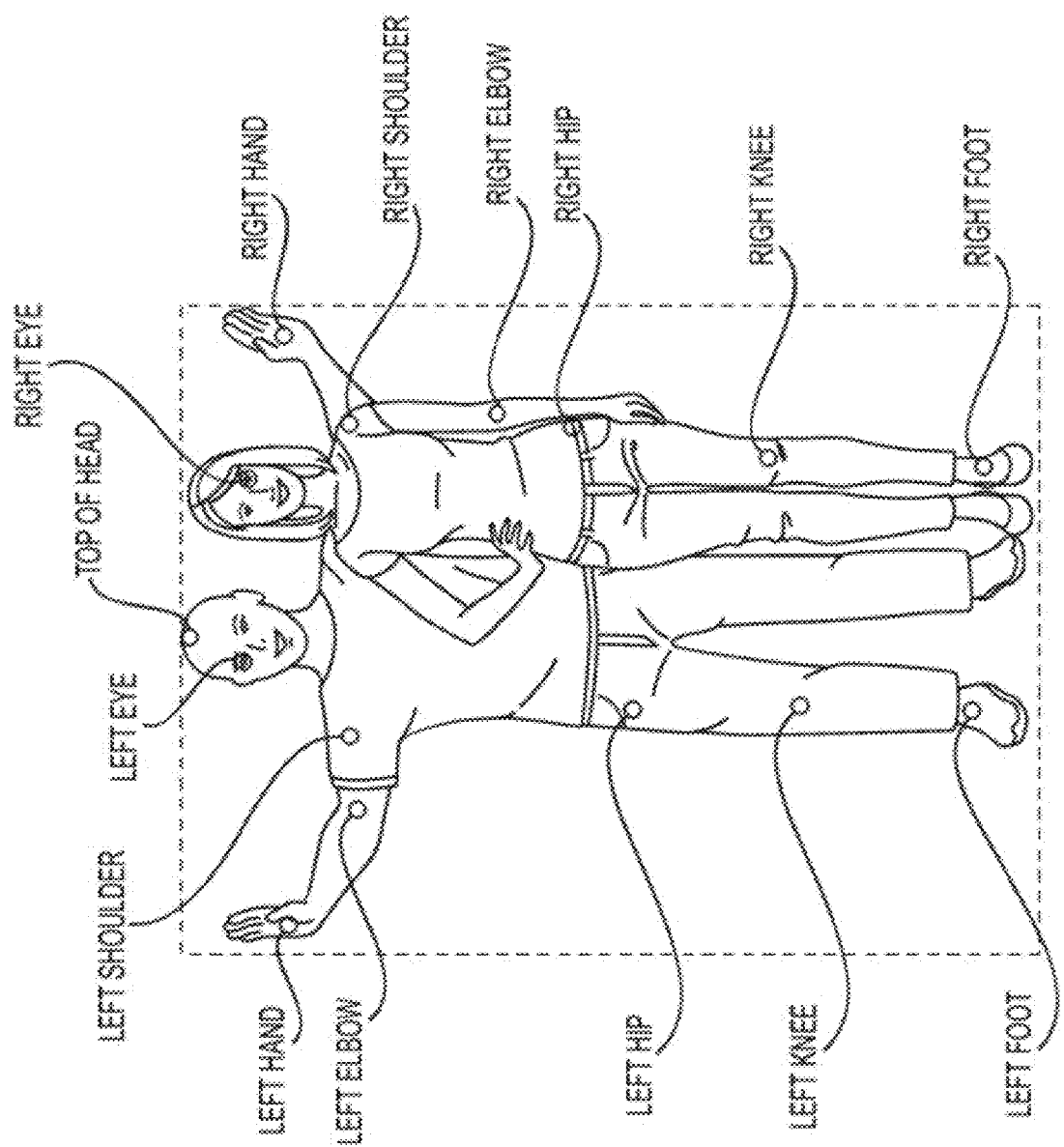
FIG. 9 illustrates an example visualization of a problem arising from two overlapping people.

FIG. 9 illustrates an example visualization of a problem arising from two overlapping people. FIG. 9 may include a bounding box that has two people in it: a man and a woman. The 2D Pose data may be unable to distinguish between two different people who are located so close to one another. Because the woman and the man are in the same space, the 2D Pose data may assign both people the same bounding box. This may be problematic because the intelligent director may think that only one person is inside the bounding box. This may lead to the intelligent director assigning labels to the wrong body parts (e.g. as shown in FIG. 9). This may cause the intelligent director to make inappropriate decisions. The solution to this problem is illustrated in FIG. 11.

Figure 10B:
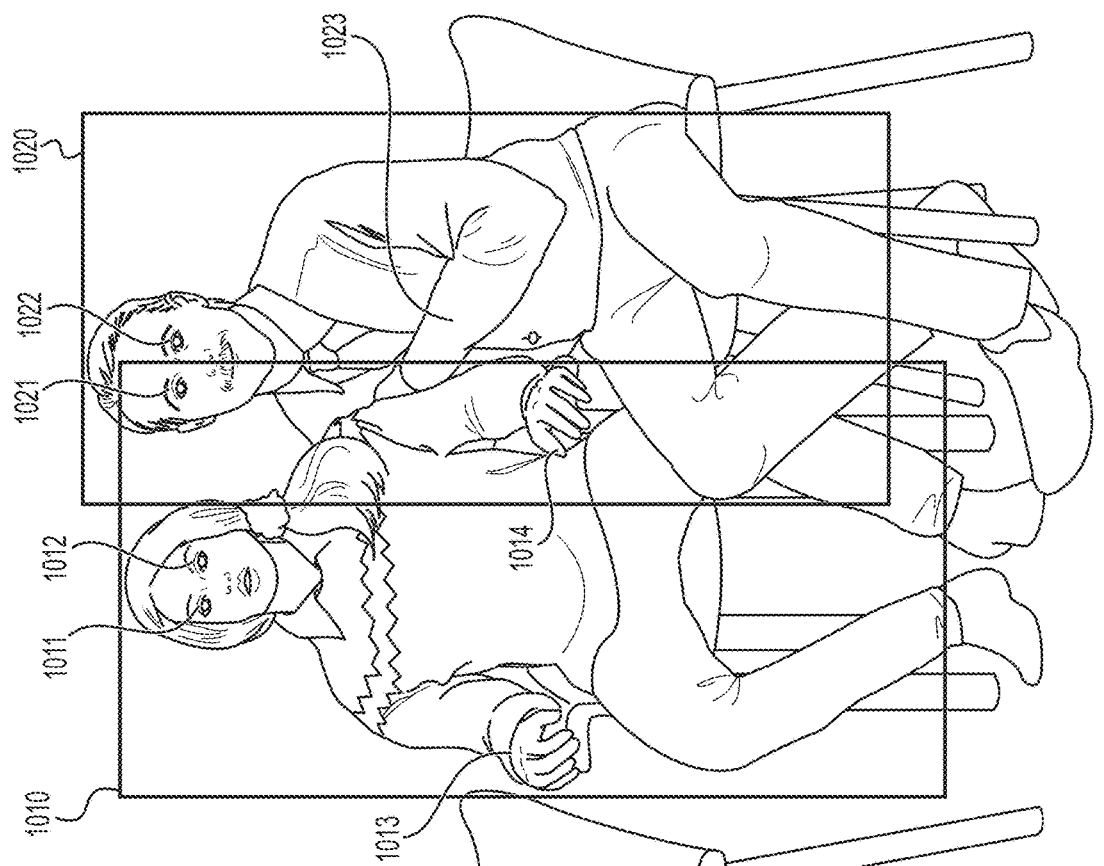
FIGS. 10A and 10B illustrate an example visualization of another problem arising from two overlapping people.
Figure 10A:

FIGS. 10A and 10B illustrate an example visualization of another problem arising from two overlapping people. In this scenario, the two people are only partially overlapping, so their bounding boxes 1010 and 1020 are only partially overlapping (as opposed to sharing the same bounding box as illustrated in FIG. 9). The woman on the left of FIGS. 10A and 10B may correspond to bounding box 1010. The man on the right may correspond to bounding box 1020. In the simplest case, each person would correspond to their own bounding box and none of the bounding boxes would overlap. Thus, each bounding box would have two eyes, two ears, two arms, two legs, etc., corresponding to the human skeleton within the bounding box. In this more complex scenario, the two people are overlapping. This may result in some irregularities that may nevertheless need to be handled by the intelligent director 132. As an example and not by way of limitation, bounding box 1020 may only contain one eye 1022, and bounding box 1010 may contain three eyes 1011, 1012, and 1021. Additionally, bounding box 1020 may contain two arms 1023 and 1014, but only one of the arms may properly correspond to the human skeleton corresponding to bounding box 1020 (e.g., the man on the right). To attribute body parts to the proper human skeleton, the intelligent director 132 may employ the process discussed with reference to FIGS. 11 and 15 below. In addition, the intelligent director may use one or more statistical models to make the proper associations. As an example and not by way of limitation, the intelligent director 132 may determine that it is statistically improbable for a human skeleton to possess three eyes. Thus, it may determine that one of eyes 1011, 1012, and 1021 may not properly correspond to the human skeleton of bounding box 1010. The intelligent director 132 may measure the distance between each of eyes 1011, 1012, and 1021. It may determine that eyes 1011 and 1012 are closer together than eye 1021 is to either eye 1011 or 1012. Statistically, it is more likely that eyes 1011 and 1012 belong to the same person and eye 1021 belongs to a different person, based on their relative distances. Thus, it may determine that eyes 1011 and 1012 belong to one person, and eye 1021 belongs to another person whose bounding box is overlapping with bounding box 1010. In particular embodiments, face detection may also serve to disambiguate overlapping people. Although this disclosure describes associating body parts to a human skeleton in a particular manner, this disclosure contemplates associating body parts to human skeletons in any particular manner.

Figure 11:
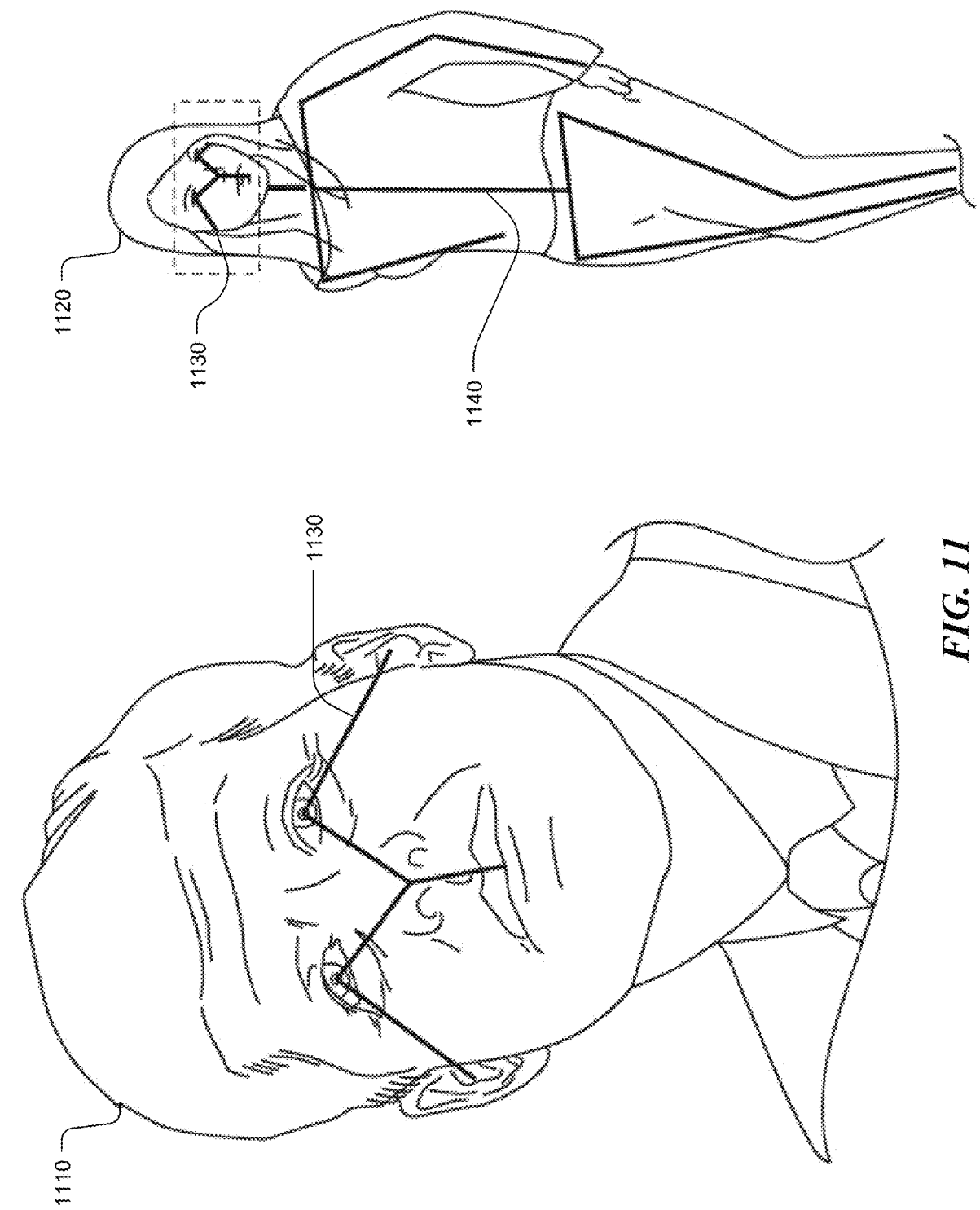
FIG. 11 illustrates an example visualization for disambiguating overlapping people by the intelligent communication device.

FIG. 11 illustrates an example visualization for disambiguating overlapping people by the intelligent communication device. To disambiguate users who are overlapping and thus share the same bounding box, a processor may identify, from a set of coordinate points that correspond to a plurality of surface points of a person in an environment (e.g., 2D Pose data), a coordinate point that corresponds to a facial feature of the person. As an example and not by way of limitation, person may be person 1110 and/or person 1120. The facial feature may be the person's left eye. The processor may then generate a facial structure 1130 for a face of the person. The facial structure 1030 may attempt to map the facial features of the person's face. It may cover a plurality of facial features of the person. The facial structure 1130 may also need to substantially match a pre-determined facial structure. This is because almost all faces have features in the same relative locations: nose between and below eyes, ears outside of and slightly below eyes. If the processor can map a facial structure that matches the predetermined facial structure onto facial points in 2D Pose data, it may be more confident in determining that there is a single person associated with the facial structure. Once the facial structure has been mapped, the processor may generate a body skeletal structure 1140 for the person. The body skeletal structure may need to substantially match a predetermined body skeletal structure, because most people's bodies may have similar body structures: a torso below the head, arms and legs at the peripheries of the torso. If the generated skeletal body structure does not substantially match the predetermined structure, the intelligent director may decrease the likelihood that the generated body skeletal structure corresponds to a single person. In particular embodiments, the body skeletal structure may also align with the facial structure in at least one dimension (e.g., vertically, as shown by facial structure 1130 and body structure 1140). If this is the case, it may increase the likelihood that the generated body skeletal structure corresponds to a single person.

In particular embodiments, if the likelihood that the generated body skeletal structure corresponds to a single person exceeds a threshold, the processor may associate the generated body skeletal structure and facial structure with a particular person in the environment. The processor may not identify the person by name but may instead determine that the set of coordinate points in the 2D Pose data correspond to a single person. Based on this determination, the intelligent director may determine one or more instructions for a camera, microphone, speaker, or display screen based on the generated body skeletal structure and facial structure. As an example and not by way of limitation, the intelligent director may provide instructions to zoom in closely to a particular face as determined by the facial structure. This may allow for the display screen to show a closely cropped face, instead of two faces, as would be the case if the intelligent director merely relied on the 2D Pose data without mapping any facial or body skeletal structures to the 2D Pose data. FIG. 12 illustrates an example method 1200 for determining cinematic decisions based on a descriptive model of an environment. The method may begin at step 1210, where a computing device may access input data from one or more different input sources, the input sources comprising: one or more cameras, one or more microphones, and a social graph maintained by a social-networking system. At step 1220, the computing device may, based on the input data and subject to privacy settings of the device 130 owner and all relevant users, generate a current descriptive model for a current audio-video communication session that comprises one or more descriptive characteristics about (1) an environment associated with the current audio-video communication session, (2) one or more people within the environment, or (3) one or more contextual elements associated with the current audio-video communication session. At step 1230, the computing device may generate one or more instructions for the current audio-video communication session that are based the one or more descriptive characteristics. At step 1240, the computing device may send the one or more instructions to a computing device associated with the one or more cameras and the one or more microphones.

FIG. 13 illustrates an example method for determining a foreground and background description during an audio-video communication session. At step 1310, a computing device may access foreground visual data that comprises a set of coordinate points that correspond to a plurality of surface points of a person in an environment. At step 1320, a computing device may generate a bounding box for the set of coordinate points, wherein the bounding box comprises every coordinate point in the set of coordinate points. At step 1330, a computing device may provide instructions to collect background visual data for an area in the environment that is outside of the bounding box. At step 1340, a computing device may provide the foreground visual data and the background visual data to an intelligent director associated with the computing device.

Figure 14:
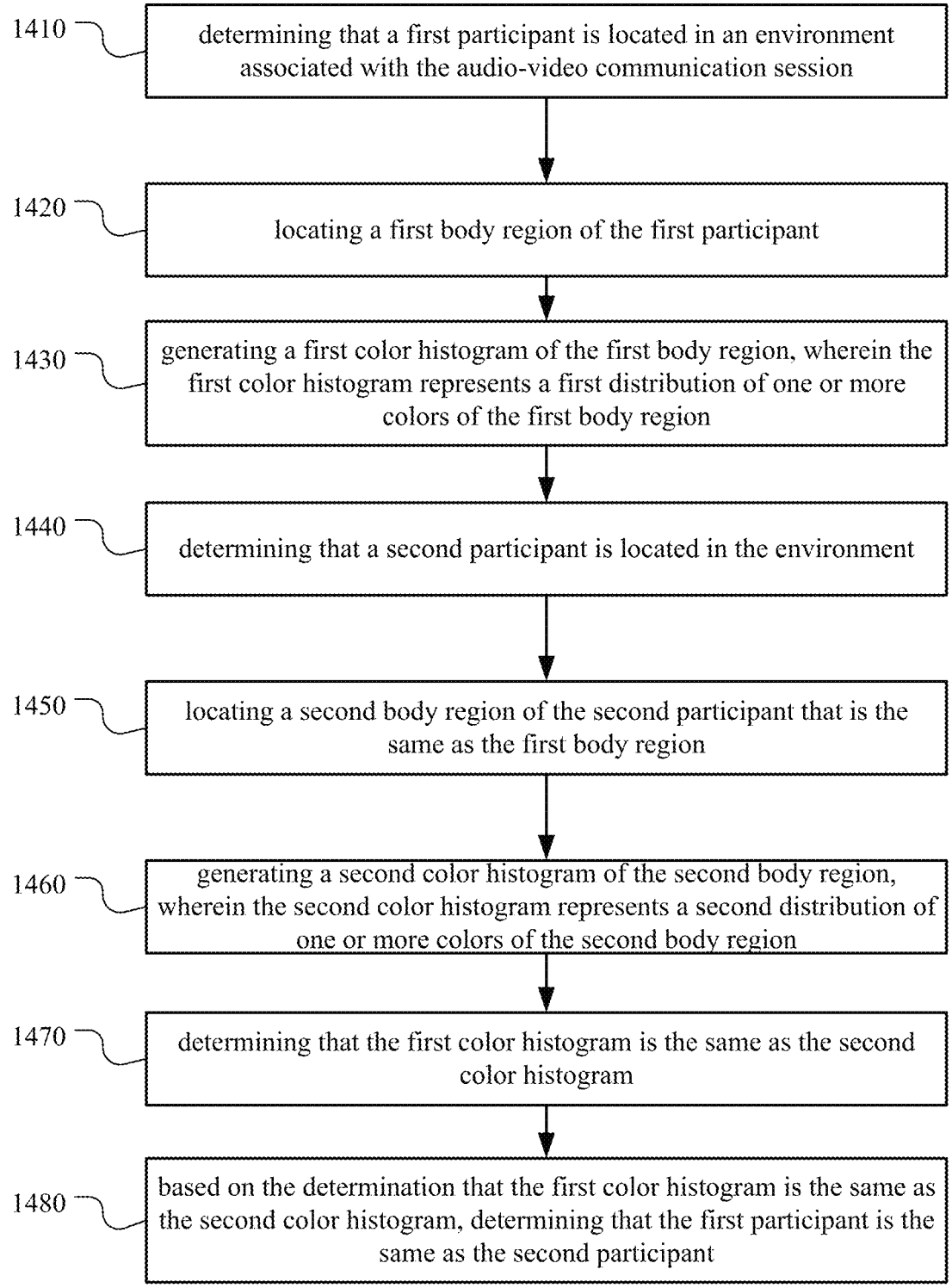
FIG. 14 illustrates an example method for re-identifying people during an audio-video communication session.

FIG. 14 illustrates an example method for re-identifying people during an audio-video communication session. Steps 1410 through 1430 may be performed at a first time, and steps 1440 through 1380 may be performed at a second time that is after the first time. At step 1410, a computing device may, determine that a first participant is located in an environment associated with the audio-video communication session. At step 1420, a computing device may locate a first body region of the first participant. At step 1430, a computing device may generate a first (and, in particular embodiments, non-identifying) color histogram of the first body region, wherein the first non-identifying color histogram represents a first distribution of one or more colors of the first body region. At step 1440, a computing device may determine that a second participant is located in the environment. At step 1450, a computing device may locate a second body region of the second participant that is the same as the first body region. At step 1460, a computing device may generate a second (and, in particular embodiments, non-identifying) color histogram of the second body region, wherein the second color histogram represents a second distribution of one or more colors of the second body region. At step 1470, a computing device may determine that the first color histogram is the same as the second color histogram. At step 1480, a computing device may, based on the determination that the first color histogram is the same as the second color histogram, determine that the first participant is the same as the second participant.

FIG. 15 illustrates an example method for disambiguating overlapping people during an audio-video communication session. At step 1510, a computing device may identify, from a set of coordinate points that correspond to a plurality of surface points of a person in an environment, a coordinate point that corresponds to a facial feature of the person. At step 1520, a computing device may generate a facial structure for a face of the person, wherein the facial structure covers a plurality of facial features of the person and substantially matches a pre-determined facial structure. At step 1530, a computing device may generate a body skeletal structure for the person, wherein the body skeletal structure substantially matches a predetermined body skeletal structure and substantially aligns with the generated facial structure in at least one dimension of a two-dimensional coordinate plane. At step 1540, a computing device may associate the generated body skeletal structure and facial structure with the person in the environment. At step 1550, a computing device may determine one or more instructions for a camera, microphone, speaker, or display screen based on the generated body skeletal structure and facial structure.

Particular embodiments may repeat one or more steps of the method of FIGS. 12-15, where appropriate. Although this disclosure describes and illustrates particular steps of the method of FIGS. 12-15 as occurring in a particular order, this disclosure contemplates any suitable steps of the method of FIGS. 12-15 occurring in any suitable order. Moreover, although this disclosure describes and illustrates an example methods including the particular steps of the method of FIGS. 12-15, this disclosure contemplates any suitable methods for carrying out the embodiments discussed herein including any suitable steps, which may include all, some, or none of the steps of the method of FIGS. 12-15, where appropriate. Furthermore, although this disclosure describes and illustrates particular components, devices, or systems carrying out particular steps of the method of FIGS. 12-15, this disclosure contemplates any suitable combination of any suitable components, devices, or systems carrying out any suitable steps of the method of FIGS. 12-15.

Figure 16:
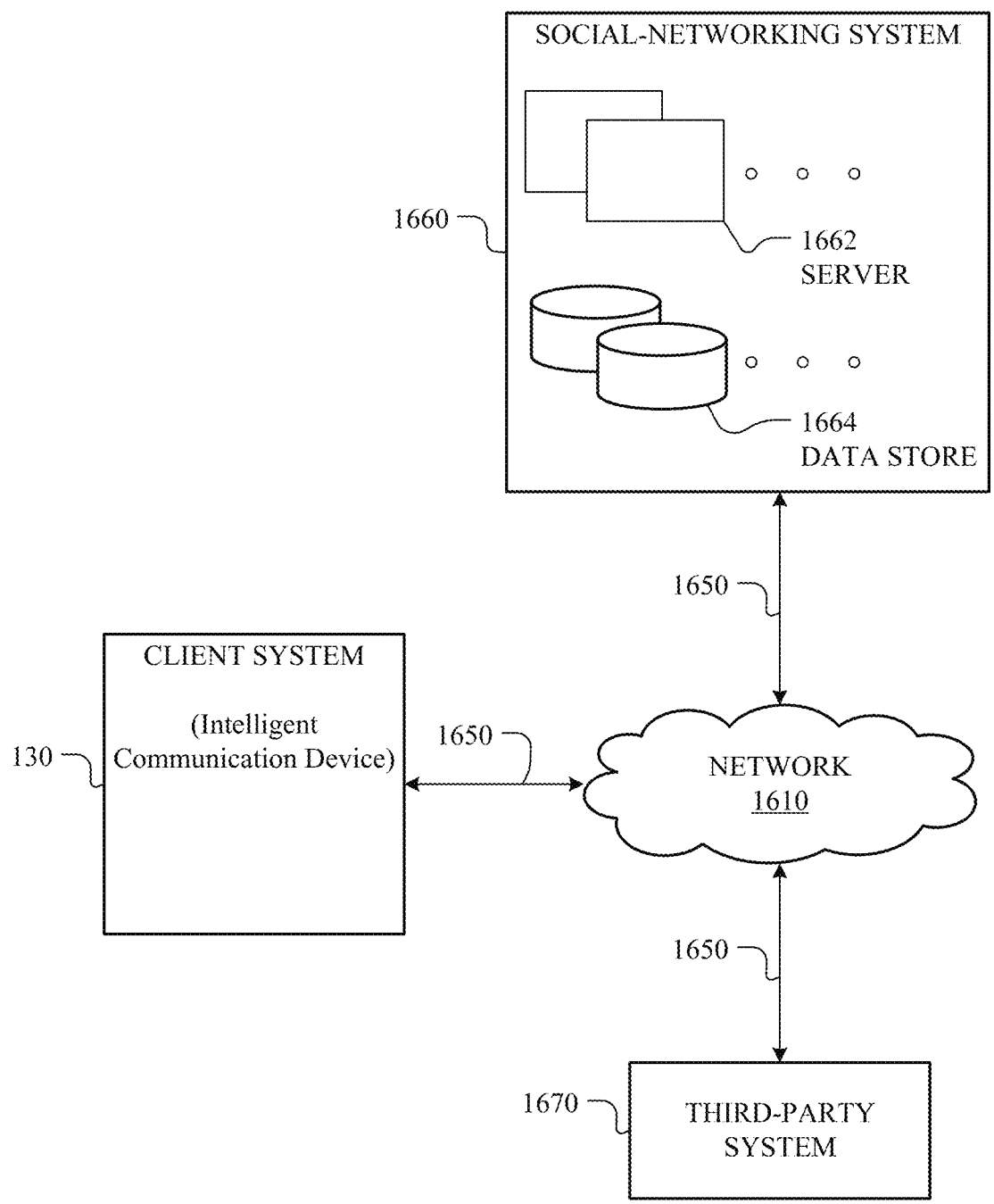
FIG. 16 illustrates an example network environment associated with a social-networking system.

FIG. 16 illustrates an example network environment 1600 associated with a social-networking system. Network environment 1600 includes a client system 1630, a social-networking system 1660, and a third-party system 1670 connected to each other by a network 1610. Although FIG. 16 illustrates a particular arrangement of client system 1630, social-networking system 1660, third-party system 1670, and network 1610, this disclosure contemplates any suitable arrangement of client system 1630, social-networking system 1660, third-party system 1670, and network 1610. As an example and not by way of limitation, two or more of client system 1630, social-networking system 1660, and third-party system 1670 may be connected to each other directly, bypassing network 1610. As another example, two or more of client system 1630, social-networking system 1660, and third-party system 1670 may be physically or logically co-located with each other in whole or in part. Moreover, although FIG. 16 illustrates a particular number of client systems 1630, social-networking systems 1660, third-party systems 1670, and networks 1610, this disclosure contemplates any suitable number of client systems 1630, social-networking systems 1660, third-party systems 1670, and networks 1610. As an example and not by way of limitation, network environment 1600 may include multiple client system 1630, social-networking systems 1660, third-party systems 1670, and networks 1610.

This disclosure contemplates any suitable network 1610. As an example and not by way of limitation, one or more portions of network 1610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1610 may include one or more networks 1610.

Links 1650 may connect client system 1630, social-networking system 1660, and third-party system 1670 to communication network 1610 or to each other. This disclosure contemplates any suitable links 1650. In particular embodiments, one or more links 1650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1650, or a combination of two or more such links 1650. Links 1650 need not necessarily be the same throughout network environment 1600. One or more first links 1650 may differ in one or more respects from one or more second links 1650.

In particular embodiments, client system 1630 may be an electronic device including hardware, software, or embedded logic components or a combination of two or more such components and capable of carrying out the appropriate functionalities implemented or supported by client system 1630. As an example and not by way of limitation, a client system 1630 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1630. A client system 1630 may enable a network user at client system 1630 to access network 1610.

A client system 1630 may enable its user to communicate with other users at other client systems 1630.

In particular embodiments, client system 1630 may include a web browser 1632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 1630 may enter a Uniform Resource Locator (URL) or other address directing the web browser 1632 to a particular server (such as server 1662, or a server associated with a third-party system 1670), and the web browser 1632 may generate a Hyper Text Transfer Protocol (HTTP) request and communicate the HTTP request to server. The server may accept the HTTP request and communicate to client system 1630 one or more Hyper Text Markup Language (HTML) files responsive to the HTTP request. Client system 1630 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 1660 may be a network-addressable computing system that can host an online social network. Social-networking system 1660 may generate, store, receive, and send social-networking data, such as, for example, user-profile data, concept-profile data, social-graph information, or other suitable data related to the online social network. Social-networking system 1660 may be accessed by the other components of network environment 1600 either directly or via network 1610. As an example and not by way of limitation, client system 1630 may access social-networking system 1660 using a web browser 1632, or a native application associated with social-networking system 1660 (e.g., a mobile social-networking application, a messaging application, another suitable application, or any combination thereof) either directly or via network 1610. In particular embodiments, social-networking system 1660 may include one or more servers 1662. Each server 1662 may be a unitary server or a distributed server spanning multiple computers or multiple datacenters. Servers 1662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1662 may include hardware, software, or embedded logic components or a combination of two or more such components for carrying out the appropriate functionalities implemented or supported by server 1662. In particular embodiments, social-networking system 1660 may include one or more data stores 1664. Data stores 1664 may be used to store various types of information. In particular embodiments, the information stored in data stores 1664 may be organized according to specific data structures. In particular embodiments, each data store 1664 may be a relational, columnar, correlation, or other suitable database. Although this disclosure describes or illustrates particular types of databases, this disclosure contemplates any suitable types of databases. Particular embodiments may provide interfaces that enable a client system 1630, a social-networking system 1660, or a third-party system 1670 to manage, retrieve, modify, add, or delete, the information stored in data store 1664.

In particular embodiments, social-networking system 1660 may store one or more social graphs in one or more data stores 1664. In particular embodiments, a social graph may include multiple nodes—which may include multiple user nodes (each corresponding to a particular user) or multiple concept nodes (each corresponding to a particular concept)—and multiple edges connecting the nodes. Social-networking system 1660 may provide users of the online social network the ability to communicate and interact with other users. In particular embodiments, users may join the online social network via social-networking system 1660 and then add connections (e.g., relationships) to a number of other users of social-networking system 1660 to whom they want to be connected. Herein, the term "friend" may refer to any other user of social-networking system 1660 with whom a user has formed a connection, association, or relationship via social-networking system 1660.

In particular embodiments, social-networking system 1660 may provide users with the ability to take actions on various types of items or objects, supported by social-networking system 1660. As an example and not by way of limitation, the items and objects may include groups or social networks to which users of social-networking system 1660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1660 or by an external system of third-party system 1670, which is separate from social-networking system 1660 and coupled to social-networking system 1660 via a network 1610.

In particular embodiments, social-networking system 1660 may be capable of linking a variety of entities. As an example and not by way of limitation, social-networking system 1660 may enable users to interact with each other as well as receive content from third-party systems 1670 or other entities, or to allow users to interact with these entities through an application programming interfaces (API) or other communication channels.

In particular embodiments, a third-party system 1670 may include one or more types of servers, one or more data stores, one or more interfaces, including but not limited to APIs, one or more web services, one or more content sources, one or more networks, or any other suitable components, e.g., that servers may communicate with. A third-party system 1670 may be operated by a different entity from an entity operating social-networking system 1660. In particular embodiments, however, social-networking system 1660 and third-party systems 1670 may operate in conjunction with each other to provide social-networking services to users of social-networking system 1660 or third-party systems 1670. In this sense, social-networking system 1660 may provide a platform, or backbone, which other systems, such as third-party systems 1670, may use to provide social-networking services and functionality to users across the Internet.

In particular embodiments, a third-party system 1670 may include a third-party content object provider. A third-party content object provider may include one or more sources of content objects, which may be communicated to a client system 1630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1660 also includes user-generated content objects, which may enhance a user's interactions with social-networking system 1660. User-generated content may include anything a user can add, upload, send, or "post" to social-networking system 1660. As an example and not by way of limitation, a user communicates posts to social-networking system 1660 from a client system 1630. Posts may include data such as status updates or other textual data, location information, photos, videos, links, music or other similar data or media. Content may also be added to social-networking system 1660 by a third-party through a "communication channel," such as a newsfeed or stream.

In particular embodiments, social-networking system 1660 may include a variety of servers, sub-systems, programs, modules, logs, and data stores. In particular embodiments, social-networking system 1660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1660 may also include suitable components such as network interfaces, security mechanisms, load balancers, failover servers, management-and-network-operations consoles, other suitable components, or any suitable combination thereof. In particular embodiments, social-networking system 1660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1660 to one or more client systems 1630 or one or more third-party system 1670 via network 1610. The web server may include a mail server or other messaging functionality for receiving and routing messages between social-networking system 1660 and one or more client systems 1630. An API-request server may allow a third-party system 1670 to access information from social-networking system 1660 by calling one or more APIs.

An action logger may be used to receive communications from a web server about a user's actions on or off social-networking system 1660. In conjunction with the action log, a third-party-content-object log may be maintained of user exposures to third-party-content objects. A notification controller may provide information regarding content objects to a client system 1630. Information may be pushed to a client system 1630 as notifications, or information may be pulled from client system 1630 responsive to a request received from client system 1630. Authorization servers may be used to enforce one or more privacy settings of the users of social-networking system 1660. A privacy setting of a user determines how particular information associated with a user can be shared. The authorization server may allow users to opt in to or opt out of having their actions logged by social-networking system 1660 or shared with other systems (e.g., third-party system 1670), such as, for example, by setting appropriate privacy settings. Third-party-content-object stores may be used to store content objects received from third parties, such as a third-party system 1670. Location stores may be used for storing location information received from client systems 1630 associated with users. Advertisement-pricing modules may combine social information, the current time, location information, or other suitable information to provide relevant advertisements, in the form of notifications, to a user.

Figure 17:
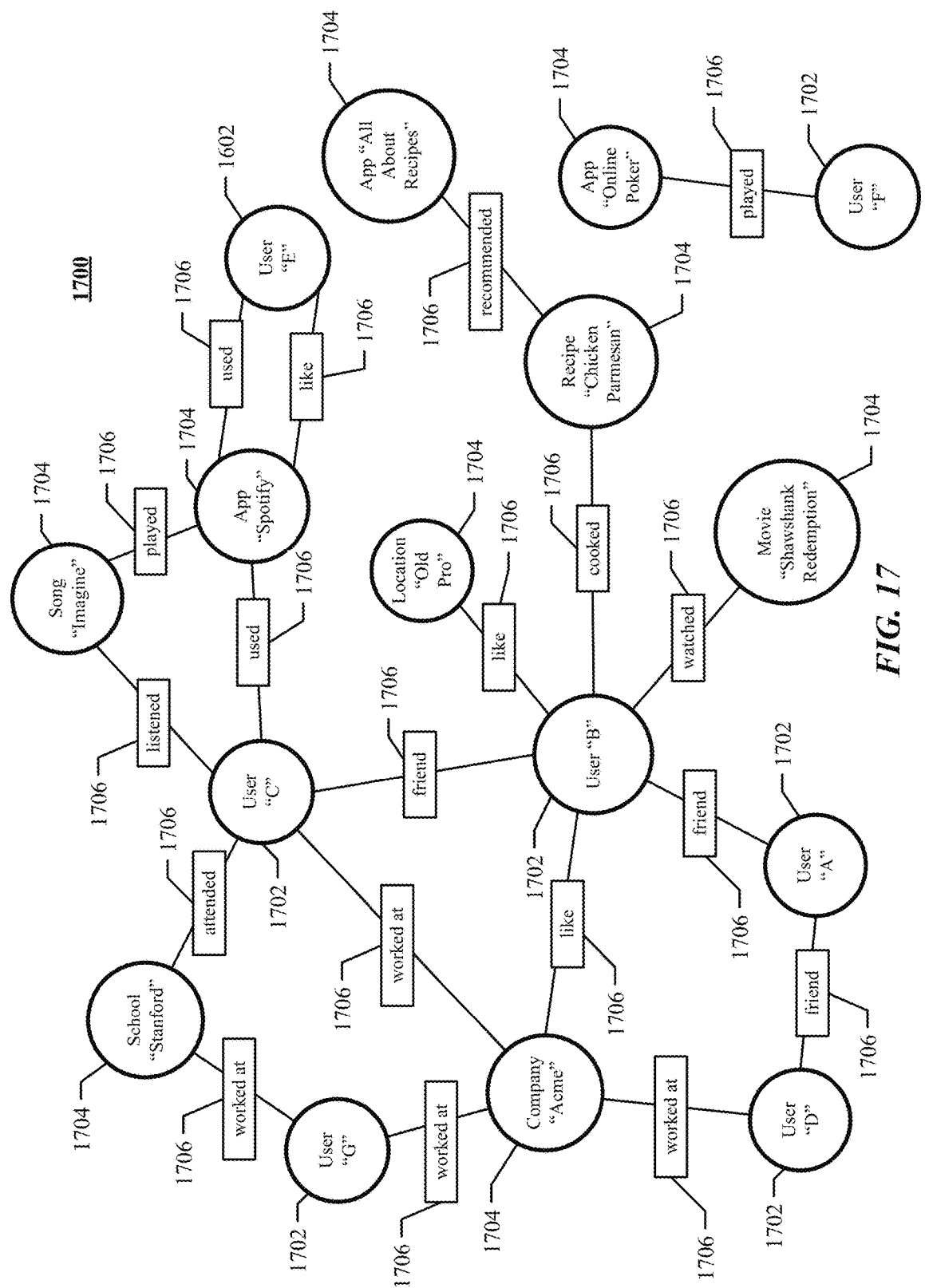
FIG. 17 illustrates an example social graph.

FIG. 17 illustrates example social graph 1700. In particular embodiments, social-networking system 1660 may store one or more social graphs 1700 in one or more data stores. In particular embodiments, social graph 1700 may include multiple nodes—which may include multiple user nodes 1702 or multiple concept nodes 1704—and multiple edges 1706 connecting the nodes. Each node may be associated with a unique entity (i.e., user or concept), each of which may have a unique identifier (ID), such as a unique number or username. Example social graph 1700 illustrated in FIG. 16 is shown, for didactic purposes, in a two-dimensional visual map representation. In particular embodiments, a social-networking system 1660, client system 1630, or third-party system 1670 may access social graph 1700 and related social-graph information for suitable applications. The nodes and edges of social graph 1700 may be stored as data objects, for example, in a data store (such as a social-graph database). Such a data store may include one or more searchable or queryable indexes of nodes or edges of social graph 1700.

In particular embodiments, a user node 1702 may correspond to a user of social-networking system 1660. As an example and not by way of limitation, a user may be an individual (human user), an entity (e.g., an enterprise, business, or third-party application), or a group (e.g., of individuals or entities) that interacts or communicates with or over social-networking system 1660. In particular embodiments, when a user registers for an account with social-networking system 1660, social-networking system 1660 may create a user node 1702 corresponding to the user, and store the user node 1702 in one or more data stores. Users and user nodes 1702 described herein may, where appropriate, refer to registered users and user nodes 1702 associated with registered users. In addition or as an alternative, users and user nodes 1702 described herein may, where appropriate, refer to users that have not registered with social-networking system 1660. In particular embodiments, a user node 1702 may be associated with information provided by a user or information gathered by various systems, including social-networking system 1660. As an example and not by way of limitation, a user may provide his or her name, profile picture, contact information, birth date, sex, marital status, family status, employment, education background, preferences, interests, or other demographic information. In particular embodiments, a user node 1702 may be associated with one or more data objects corresponding to information associated with a user. In particular embodiments, a user node 1702 may correspond to one or more webpages.

In particular embodiments, a concept node 1704 may correspond to a concept. As an example and not by way of limitation, a concept may correspond to a place (such as, for example, a movie theater, restaurant, landmark, or city); a website (such as, for example, a website associated with social-network system 1660 or a third-party website associated with a web-application server); an entity (such as, for example, a person, business, group, sports team, or celebrity); a resource (such as, for example, an audio file, video file, digital photo, text file, structured document, or application) which may be located within social-networking system 1660 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 1704 may be associated with information of a concept provided by a user or information gathered by various systems, including social-networking system 1660. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1704 may be associated with one or more data objects corresponding to information associated with concept node 1704. In particular embodiments, a concept node 1704 may correspond to one or more webpages.

In particular embodiments, a node in social graph 1700 may represent or be represented by a webpage (which may be referred to as a "profile page"). Profile pages may be hosted by or accessible to social-networking system 1660. Profile pages may also be hosted on third-party websites associated with a third-party system 1670. As an example and not by way of limitation, a profile page corresponding to a particular external webpage may be the particular external webpage and the profile page may correspond to a particular concept node 1704. Profile pages may be viewable by all or a selected subset of other users. As an example and not by way of limitation, a user node 1702 may have a corresponding user-profile page in which the corresponding user may add content, make declarations, or otherwise express himself or herself. As another example and not by way of limitation, a concept node 1704 may have a corresponding concept-profile page in which one or more users may add content, make declarations, or express themselves, particularly in relation to the concept corresponding to concept node 1704.

In particular embodiments, a concept node 1704 may represent a third-party webpage or resource hosted by a third-party system 1670. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 1630 to send to social-networking system 1660 a message indicating the user's action. In response to the message, social-networking system 1660 may create an edge (e.g., a check-in-type edge) between a user node 1702 corresponding to the user and a concept node 1704 corresponding to the third-party webpage or resource and store edge 1706 in one or more data stores.

In particular embodiments, a pair of nodes in social graph 1700 may be connected to each other by one or more edges 1706. An edge 1706 connecting a pair of nodes may represent a relationship between the pair of nodes. In particular embodiments, an edge 1706 may include or represent one or more data objects or attributes corresponding to the relationship between a pair of nodes. As an example and not by way of limitation, a first user may indicate that a second user is a "friend" of the first user. In response to this indication, social-networking system 1660 may send a "friend request" to the second user. If the second user confirms the "friend request," social-networking system 1660 may create an edge 1706 connecting the first user's user node 1702 to the second user's user node 1702 in social graph 1700 and store edge 1706 as social-graph information in one or more of data stores 1664. In the example of FIG. 16, social graph 1700 includes an edge 1706 indicating a friend relation between user nodes 1702 of user "A" and user "B" and an edge indicating a friend relation between user nodes 1702 of user "C" and user "B." Although this disclosure describes or illustrates particular edges 1706 with particular attributes connecting particular user nodes 1702, this disclosure contemplates any suitable edges 1706 with any suitable attributes connecting user nodes 1702. As an example and not by way of limitation, an edge 1706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1700 by one or more edges 1706. The degree of separation between two objects represented by two nodes, respectively, is a count of edges in a shortest path connecting the two nodes in the social graph 1700. As an example and not by way of limitation, in the social graph 1700, the user node 1702 of user "C" is connected to the user node 1702 of user "A" via multiple paths including, for example, a first path directly passing through the user node 1702 of user "B," a second path passing through the concept node 1704 of company "Acme" and the user node 1702 of user "D," and a third path passing through the user nodes 1702 and concept nodes 1704 representing school "Stanford," user "G," company "Acme," and user "D." User "C" and user "A" have a degree of separation of two because the shortest path connecting their corresponding nodes (i.e., the first path) includes two edges 1706.

In particular embodiments, an edge 1706 between a user node 1702 and a concept node 1704 may represent a particular action or activity performed by a user associated with user node 1702 toward a concept associated with a concept node 1704. As an example and not by way of limitation, as illustrated in FIG. 17, a user may "like," "attended," "played," "listened," "cooked," "worked at," or "watched" a concept, each of which may correspond to an edge type or subtype. A concept-profile page corresponding to a concept node 1704 may include, for example, a selectable "check in" icon (such as, for example, a clickable "check in" icon) or a selectable "add to favorites" icon. Similarly, after a user clicks these icons, social-networking system 1660 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 1660 may create a "listened" edge 1706 and a "used" edge (as illustrated in FIG. 16) between user nodes 1702 corresponding to the user and concept nodes 1704 corresponding to the song and application to indicate that the user listened to the song and used the application. Moreover, social-networking system 1660 may create a "played" edge 1706 (as illustrated in FIG. 16) between concept nodes 1704 corresponding to the song and the application to indicate that the particular song was played by the particular application. In this case, "played" edge 1706 corresponds to an action performed by an external application (SPOTIFY) on an external audio file (the song "Imagine"). Although this disclosure describes particular edges 1706 with particular attributes connecting user nodes 1702 and concept nodes 1704, this disclosure contemplates any suitable edges 1706 with any suitable attributes connecting user nodes 1702 and concept nodes 1704. Moreover, although this disclosure describes edges between a user node 1702 and a concept node 1704 representing a single relationship, this disclosure contemplates edges between a user node 1702 and a concept node 1704 representing one or more relationships. As an example and not by way of limitation, an edge 1706 may represent both that a user likes and has used at a particular concept. Alternatively, another edge 1706 may represent each type of relationship (or multiples of a single relationship) between a user node 1702 and a concept node 1704 (as illustrated in FIG. 16 between user node 1702 for user "E" and concept node 1704 for "SPOTIFY").

In particular embodiments, social-networking system 1660 may create an edge 1706 between a user node 1702 and a concept node 1704 in social graph 1700. As an example and not by way of limitation, a user viewing a concept-profile page (such as, for example, by using a web browser or a special-purpose application hosted by the user's client system 1630) may indicate that he or she likes the concept represented by the concept node 1704 by clicking or selecting a "Like" icon, which may cause the user's client system 1630 to send to social-networking system 1660 a message indicating the user's liking of the concept associated with the concept-profile page. In response to the message, social-networking system 1660 may create an edge 1706 between user node 1702 associated with the user and concept node 1704, as illustrated by "like" edge 1706 between the user and concept node 1704. In particular embodiments, social-networking system 1660 may store an edge 1706 in one or more data stores. In particular embodiments, an edge 1706 may be automatically formed by social-networking system 1660 in response to a particular user action. As an example and not by way of limitation, if a first user uploads a picture, watches a movie, or listens to a song, an edge 1706 may be formed between user node 1702 corresponding to the first user and concept nodes 1704 corresponding to those concepts. Although this disclosure describes forming particular edges 1706 in particular manners, this disclosure contemplates forming any suitable edges 1706 in any suitable manner.

In particular embodiments, social-networking system 1660 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1670 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 1660 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 1660 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 1660 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 1660 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 1660 may calculate a coefficient based on a user's actions. Social-networking system 1660 may monitor such actions on the online social network, on a third-party system 1670, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 1660 may calculate a coefficient based on the user's actions with particular types of content. The content may be associated with the online social network, a third-party system 1670, or another suitable system. The content may include users, profile pages, posts, news stories, headlines, instant messages, chat room conversations, emails, advertisements, pictures, video, music, other suitable objects, or any combination thereof. Social-networking system 1660 may analyze a user's actions to determine whether one or more of the actions indicate an affinity for subject matter, content, other users, and so forth. As an example and not by way of limitation, if a user frequently posts content related to "coffee" or variants thereof, social-networking system 1660 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 1660 may calculate a coefficient based on the type of relationship between particular objects. Referencing the social graph 1700, social-networking system 1660 may analyze the number and/or type of edges 1706 connecting particular user nodes 1702 and concept nodes 1704 when calculating a coefficient. As an example and not by way of limitation, user nodes 1702 that are connected by a spouse-type edge (representing that the two users are married) may be assigned a higher coefficient than a user nodes 1702 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 1660 may determine that the user has a higher coefficient with respect to the first photo than the second photo because having a tagged-in-type relationship with content may be assigned a higher weight and/or rating than having a like-type relationship with content. In particular embodiments, social-networking system 1660 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 1660 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1700. As an example and not by way of limitation, social-graph entities that are closer in the social graph 1700 (i.e., fewer degrees of separation) may have a higher coefficient than entities that are further apart in the social graph 1700.

In particular embodiments, social-networking system 1660 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 1630 of the user). A first user may be more interested in other users or concepts that are closer to the first user. As an example and not by way of limitation, if a user is one mile from an airport and two miles from a gas station, social-networking system 1660 may determine that the user has a higher coefficient for the airport than the gas station based on the proximity of the airport to the user.

In particular embodiments, social-networking system 1660 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 1660 may provide information that is relevant to user's interests and current circumstances, increasing the likelihood that they will find such information of interest. In particular embodiments, social-networking system 1660 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 1660 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 1660 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1670 (e.g., via an API or other communication channel), or from another suitable system. In response to the request, social-networking system 1660 may calculate the coefficient (or access the coefficient information if it has previously been calculated and stored). In particular embodiments, social-networking system 1660 may measure an affinity with respect to a particular process. Different processes (both internal and external to the online social network) may request a coefficient for a particular object or set of objects. Social-networking system 1660 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 1660, a client system 1630, a third-party system 1670, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 1704 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 1660 or shared with other systems (e.g., a third-party system 1670). Although this disclosure describes using particular privacy settings in a particular manner, this disclosure contemplates using any suitable privacy settings in any suitable manner.

In particular embodiments, privacy settings may be based on one or more nodes or edges of a social graph 1700. A privacy setting may be specified for one or more edges 1706 or edge-types of the social graph 1700, or with respect to one or more nodes 1702, 1704 or node-types of the social graph 1700. The privacy settings applied to a particular edge 1706 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 1660. The object may be associated with a concept node 1704 connected to a user node 1702 of the first user by an edge 1706. The first user may specify privacy settings that apply to a particular edge 1706 connecting to the concept node 1704 of the object, or may specify privacy settings that apply to all edges 1706 connecting to the concept node 1704. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 1660 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 1660 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 1670, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 1662 may be authorization/privacy servers for enforcing privacy settings. In response to a request from a user (or other entity) for a particular object stored in a data store 1664, the social-networking system 1660 may send a request to the data store 1664 for the object. The request may identify the user associated with the request and the object may be sent only to the user (or a client system 1630 of the user) if the authorization server determines that the user is authorized to access the object based on the privacy settings associated with the object. If the requesting user is not authorized to access the object, the authorization server may prevent the requested object from being retrieved from the data store 1664 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 1660, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 1660 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 1660 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 1660 may access such information in order to provide a particular function or service to the first user, without the social-networking system 1660 having access to that information for any other purposes. Before accessing, storing, or using such objects or information, the social-networking system 1660 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 1660.

In particular embodiments, a user may specify whether particular types of objects or information associated with the first user may be accessed, stored, or used by the social-networking system 1660. As an example and not by way of limitation, the first user may specify that images sent by the first user through the social-networking system 1660 may not be stored by the social-networking system 1660. As another example and not by way of limitation, a first user may specify that messages sent from the first user to a particular second user may not be stored by the social-networking system 1660. As yet another example and not by way of limitation, a first user may specify that all objects sent via a particular application may be saved by the social-networking system 1660.

In particular embodiments, privacy settings may allow a first user to specify whether particular objects or information associated with the first user may be accessed from particular client systems 1630 or third-party systems 1670. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 1660 may provide default privacy settings with respect to each device, system, or application, and/or the first user may be prompted to specify a particular privacy setting for each context. As an example and not by way of limitation, the first user may utilize a location-services feature of the social-networking system 1660 to provide recommendations for restaurants or other places in proximity to the user. The first user's default privacy settings may specify that the social-networking system 1660 may use location information provided from a client device 1630 of the first user to provide the location-based services, but that the social-networking system 1660 may not store the location information of the first user or provide it to any third-party system 1670. The first user may then update the privacy settings to allow location information to be used by a third-party image-sharing application in order to geo-tag photos.

Privacy Settings for Mood or Sentiment Information

In particular embodiments, privacy settings may allow a user to specify whether mood or sentiment information associated with the user may be determined, and whether particular applications or processes may access, store, or use such information. The privacy settings may allow users to opt in or opt out of having mood or sentiment information accessed, stored, or used by specific applications or processes. The social-networking system 1660 may predict or determine a mood or sentiment associated with a user based on, for example, inputs provided by the user and interactions with particular objects, such as pages or content viewed by the user, posts or other content uploaded by the user, and interactions with other content of the online social network. In particular embodiments, the social-networking system 1660 may use a user's previous activities and calculated moods or sentiments to determine a present mood or sentiment. A user who wishes to enable this functionality may indicate in their privacy settings that they opt in to the social-networking system 1660 receiving the inputs necessary to determine the mood or sentiment. As an example and not by way of limitation, the social-networking system 1660 may determine that a default privacy setting is to not receive any information necessary for determining mood or sentiment until there is an express indication from a user that the social-networking system 1660 may do so. By contrast, if a user does not opt in to the social-networking system 1660 receiving these inputs (or affirmatively opts out of the social-networking system 1660 receiving these inputs), the social-networking system 1660 may be prevented from receiving, collecting, logging, or storing these inputs or any information associated with these inputs. In particular embodiments, the social-networking system 1660 may use the predicted mood or sentiment to provide recommendations or advertisements to the user. In particular embodiments, if a user desires to make use of this function for specific purposes or applications, additional privacy settings may be specified by the user to opt in to using the mood or sentiment information for the specific purposes or applications. As an example and not by way of limitation, the social-networking system 1660 may use the user's mood or sentiment to provide newsfeed items, pages, friends, or advertisements to a user. The user may specify in their privacy settings that the social-networking system 1660 may determine the user's mood or sentiment. The user may then be asked to provide additional privacy settings to indicate the purposes for which the user's mood or sentiment may be used. The user may indicate that the social-networking system 1660 may use his or her mood or sentiment to provide newsfeed content and recommend pages, but not for recommending friends or advertisements. The social-networking system 1660 may then only provide newsfeed content or pages based on user mood or sentiment, and may not use that information for any other purpose, even if not expressly prohibited by the privacy settings.

Privacy Settings for User-Authentication and Experience-Personalization Information In particular embodiments, the social-networking system 1660 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 1660. The user's privacy settings may specify that such information may be used only for particular processes, such as authentication, and further specify that such information may not be shared with any third-party system 1670 or used for other processes or applications associated with the social-networking system 1660. As another example and not by way of limitation, the social-networking system 1660 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 1670 or used by other processes or applications associated with the social-networking system 1660. As another example and not by way of limitation, the social-networking system 1660 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system 1670 or used by other processes or applications associated with the social-networking system 1660.

User-Initiated Changes to Privacy Settings

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system 1660 may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system 1660 may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, the social-networking system 1660 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system 1660 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system 1660 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system 1660 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system 1660 may send a reminder to the user to confirm his or her privacy settings every six months or after every ten photo posts. In particular embodiments, privacy settings may also allow users to control access to the objects or information on a per-request basis. As an example and not by way of limitation, the social-networking system 1660 may notify the user whenever a third-party system 1670 attempts to access information associated with the user, and require the user to provide verification that access should be allowed before proceeding.

Figure 18:
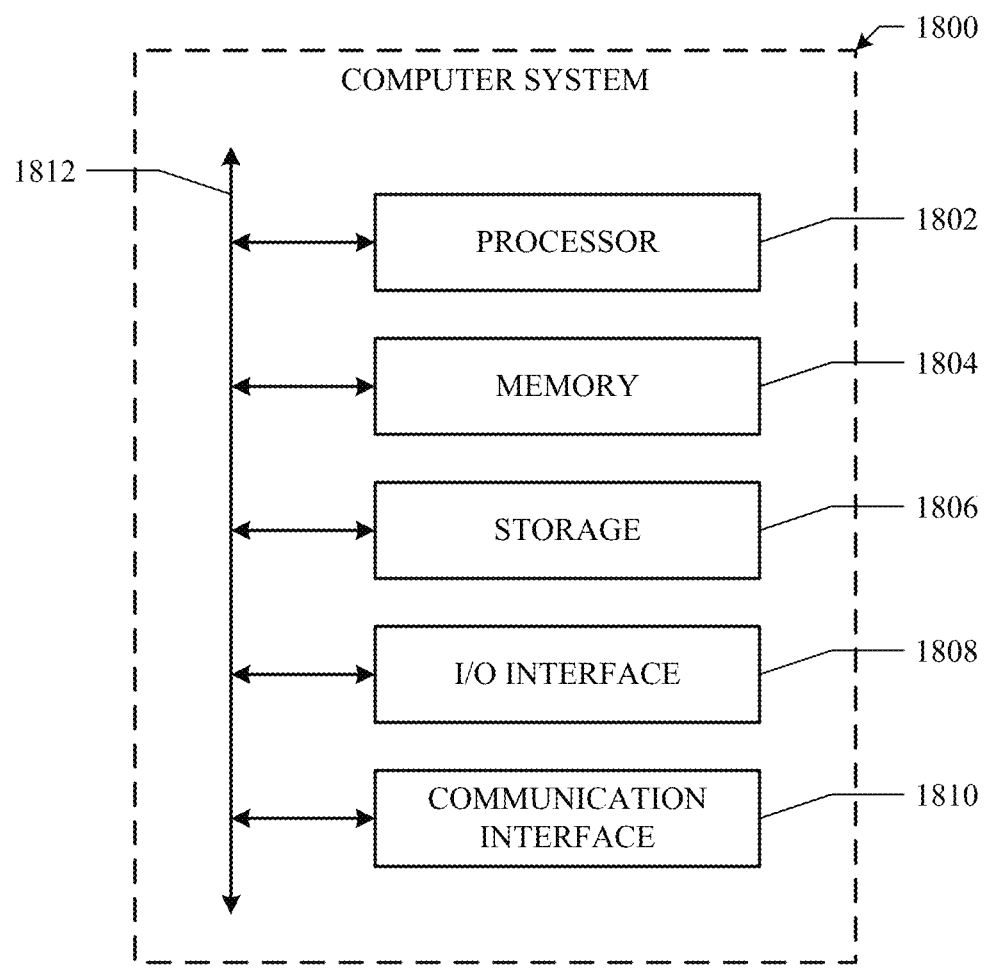
FIG. 18 illustrates an example computer system.

FIG. 18 illustrates an example computer system 1800. In particular embodiments, one or more computer systems 1800 perform one or more steps of one or more methods described or illustrated herein. In particular embodiments, one or more computer systems 1800 provide functionality described or illustrated herein. In particular embodiments, software running on one or more computer systems 1800 performs one or more steps of one or more methods described or illustrated herein or provides functionality described or illustrated herein. Particular embodiments include one or more portions of one or more computer systems 1800. Herein, reference to a computer system may encompass a computing device, and vice versa, where appropriate. Moreover, reference to a computer system may encompass one or more computer systems, where appropriate.

This disclosure contemplates any suitable number of computer systems 1800. This disclosure contemplates computer system 1800 taking any suitable physical form. As example and not by way of limitation, computer system 1800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1800 may include one or more computer systems 1800; be unitary or distributed; span multiple locations; span multiple machines; span multiple data centers; or reside in a cloud, which may include one or more cloud components in one or more networks. Where appropriate, one or more computer systems 1800 may perform without substantial spatial or temporal limitation one or more steps of one or more methods described or illustrated herein. As an example and not by way of limitation, one or more computer systems 1800 may perform in real time or in batch mode one or more steps of one or more methods described or illustrated herein. One or more computer systems 1800 may perform at different times or at different locations one or more steps of one or more methods described or illustrated herein, where appropriate.

In particular embodiments, computer system 1800 includes a processor 1802, memory 1804, storage 1806, an input/output (I/O) interface 1808, a communication interface 1810, and a bus 1812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1802 includes hardware for executing instructions, such as those making up a computer program. As an example and not by way of limitation, to execute instructions, processor 1802 may retrieve (or fetch) the instructions from an internal register, an internal cache, memory 1804, or storage 1806; decode and execute them; and then write one or more results to an internal register, an internal cache, memory 1804, or storage 1806. In particular embodiments, processor 1802 may include one or more internal caches for data, instructions, or addresses. This disclosure contemplates processor 1802 including any suitable number of any suitable internal caches, where appropriate. As an example and not by way of limitation, processor 1802 may include one or more instruction caches, one or more data caches, and one or more translation lookaside buffers (TLBs). Instructions in the instruction caches may be copies of instructions in memory 1804 or storage 1806, and the instruction caches may speed up retrieval of those instructions by processor 1802. Data in the data caches may be copies of data in memory 1804 or storage 1806 for instructions executing at processor 1802 to operate on; the results of previous instructions executed at processor 1802 for access by subsequent instructions executing at processor 1802 or for writing to memory 1804 or storage 1806; or other suitable data. The data caches may speed up read or write operations by processor 1802. The TLBs may speed up virtual-address translation for processor 1802. In particular embodiments, processor 1802 may include one or more internal registers for data, instructions, or addresses. This disclosure contemplates processor 1802 including any suitable number of any suitable internal registers, where appropriate. Where appropriate, processor 1802 may include one or more arithmetic logic units (ALUs); be a multi-core processor; or include one or more processors 1802. Although this disclosure describes and illustrates a particular processor, this disclosure contemplates any suitable processor.

In particular embodiments, memory 1804 includes main memory for storing instructions for processor 1802 to execute or data for processor 1802 to operate on. As an example and not by way of limitation, computer system 1800 may load instructions from storage 1806 or another source (such as, for example, another computer system 1800) to memory 1804. Processor 1802 may then load the instructions from memory 1804 to an internal register or internal cache. To execute the instructions, processor 1802 may retrieve the instructions from the internal register or internal cache and decode them. During or after execution of the instructions, processor 1802 may write one or more results (which may be intermediate or final results) to the internal register or internal cache. Processor 1802 may then write one or more of those results to memory 1804. In particular embodiments, processor 1802 executes only instructions in one or more internal registers or internal caches or in memory 1804 (as opposed to storage 1806 or elsewhere) and operates only on data in one or more internal registers or internal caches or in memory 1804 (as opposed to storage 1806 or elsewhere). One or more memory buses (which may each include an address bus and a data bus) may couple processor 1802 to memory 1804. Bus 1812 may include one or more memory buses, as described below. In particular embodiments, one or more memory management units (MMUs) reside between processor 1802 and memory 1804 and facilitate accesses to memory 1804 requested by processor 1802. In particular embodiments, memory 1804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1804 may include one or more memories 1804, where appropriate. Although this disclosure describes and illustrates particular memory, this disclosure contemplates any suitable memory.

In particular embodiments, storage 1806 includes mass storage for data or instructions. As an example and not by way of limitation, storage 1806 may include a hard disk drive (HDD), a floppy disk drive, flash memory, an optical disc, a magneto-optical disc, magnetic tape, or a Universal Serial Bus (USB) drive or a combination of two or more of these. Storage 1806 may include removable or non-removable (or fixed) media, where appropriate. Storage 1806 may be internal or external to computer system 1800, where appropriate. In particular embodiments, storage 1806 is non-volatile, solid-state memory. In particular embodiments, storage 1806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1806 taking any suitable physical form. Storage 1806 may include one or more storage control units facilitating communication between processor 1802 and storage 1806, where appropriate. Where appropriate, storage 1806 may include one or more storages 1806. Although this disclosure describes and illustrates particular storage, this disclosure contemplates any suitable storage.

In particular embodiments, I/O interface 1808 includes hardware, software, or both, providing one or more interfaces for communication between computer system 1800 and one or more I/O devices. Computer system 1800 may include one or more of these I/O devices, where appropriate. One or more of these I/O devices may enable communication between a person and computer system 1800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1808 for them. Where appropriate, I/O interface 1808 may include one or more device or software drivers enabling processor 1802 to drive one or more of these I/O devices. I/O interface 1808 may include one or more I/O interfaces 1808, where appropriate. Although this disclosure describes and illustrates a particular I/O interface, this disclosure contemplates any suitable I/O interface.

In particular embodiments, communication interface 1810 includes hardware, software, or both providing one or more interfaces for communication (such as, for example, packet-based communication) between computer system 1800 and one or more other computer systems 1800 or one or more networks. As an example and not by way of limitation, communication interface 1810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1810 for it. As an example and not by way of limitation, computer system 1800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1800 may include any suitable communication interface 1810 for any of these networks, where appropriate. Communication interface 1810 may include one or more communication interfaces 1810, where appropriate. Although this disclosure describes and illustrates a particular communication interface, this disclosure contemplates any suitable communication interface.

In particular embodiments, bus 1812 includes hardware, software, or both coupling components of computer system 1800 to each other. As an example and not by way of limitation, bus 1812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1812 may include one or more buses 1812, where appropriate.

Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
accessing input data from one or more different input sources, the input sources comprising: one or more cameras, one or more microphones, and a social graph maintained by a social-networking system;
based on the input data, generating a current descriptive model for a current audio-video communication session that comprises one or more descriptive characteristics about (1) an environment associated with the current audio-video communication session, (2) one or more people within the environment, or (3) one or more contextual elements associated with the current audio-video communication session;
generating one or more instructions for the current audio-video communication session that are based the one or more descriptive characteristics; and
sending the one or more instructions to a computing device associated with the one or more cameras and the one or more microphones.

2. The method of claim 1, wherein the one or more descriptive characteristics about the environment associated with the current audio-video communication session comprises:
a location for each of one or more walls within the environment;
a location for each of one or more doors within the environment;
a category of the environment; and
a location for each of one or more objects within the environment.

3. The method of claim 1, wherein the one or more descriptive characteristics about the one or more people comprises, for each person of the one or more people:
an engagement metric with the current audio-video communication session; and
an affinity between the person and at least one other person of the one or more people.

4. The method of claim 3, wherein the engagement metric for each person of the one or more people is based at least in part on a count of words spoken by the person, a physical distance between the person and the computing device, an amount of time the person has been in the environment during the current audio-video communication system, or social graph data associated with the person.

5. The method of claim 1, further comprising generating a historical descriptive model based on a plurality of past audio-video communication sessions that have occurred within the environment, wherein the one or more descriptive characteristics are based at least in part on the historical descriptive model.

6. The method of claim 1, wherein the one or more instructions comprise instructions to zoom in on a visual target, pan toward a visual target, beamform a microphone to an audio target, or cut a scene to a visual target.

7. The method of claim 1, wherein the one or more contextual elements associated with the current audio-video communication session comprises a time of day for the current audio-video communication session, a data of the current audio-video communication session, or an event associated with the current audio-video communication session.

8. One or more computer-readable non-transitory storage media embodying software that is operable when executed to:
access input data from one or more different input sources, the input sources comprising: one or more cameras, one or more microphones, and a social graph maintained by a social-networking system;
based on the input data, generate a current descriptive model for a current audio-video communication session that comprises one or more descriptive characteristics about (1) an environment associated with the current audio-video communication session, (2) one or more people within the environment, or (3) one or more contextual elements associated with the current audio-video communication session;
generate one or more instructions for the current audio-video communication session that are based the one or more descriptive characteristics; and send the one or more instructions to a computing device associated with the one or more cameras and the one or more microphones.

9. The media of claim 8, wherein the one or more descriptive characteristics about the environment associated with the current audio-video communication session comprises:
- a location for each of one or more walls within the environment;
- a location for each of one or more doors within the environment;
- a category of the environment; and
- a location for each of one or more objects within the environment.

10. The media of claim 8, wherein the one or more descriptive characteristics about the one or more people comprises, for each person of the one or more people:
- an engagement metric with the current audio-video communication session; and
- an affinity between the person and at least one other person of the one or more people.

11. The media of claim 10, wherein the engagement metric for each person of the one or more people is based at least in part on a count of words spoken by the person, a physical distance between the person and the computing device, an amount of time the person has been in the environment during the current audio-video communication system, or social graph data associated with the person.

12. The media of claim 8, wherein the software is further operable when executed to generate a historical descriptive model based on a plurality of past audio-video communication sessions that have occurred within the environment, wherein the one or more descriptive characteristics are based at least in part on the historical descriptive model.

13. The media of claim 8, wherein the one or more instructions comprise instructions to zoom in on a visual target, pan toward a visual target, beamform a microphone to an audio target, or cut a scene to a visual target.

14. The media of claim 8, wherein the one or more contextual elements associated with the current audio-video communication session comprises a time of day for the current audio-video communication session, a data of the current audio-video communication session, or an event associated with the current audio-video communication session.

15. A system comprising:
- one or more processors; and
- one or more computer-readable non-transitory storage media coupled to one or more of the processors and comprising instructions operable when executed by one or more of the processors to cause the system to:
- access input data from one or more different input sources, the input sources comprising: one or more cameras, one or more microphones, and a social graph maintained by a social-networking system;
- based on the input data, generate a current descriptive model for a current audio-video communication session that comprises one or more descriptive characteristics about (1) an environment associated with the current audio-video communication session, (2) one or more people within the environment, or (3) one or more contextual elements associated with the current audio-video communication session;
- generate one or more instructions for the current audio-video communication session that are based the one or more descriptive characteristics; and
- send the one or more instructions to a computing device associated with the one or more cameras and the one or more microphones.

16. The system of claim 15, wherein the one or more descriptive characteristics about the environment associated with the current audio-video communication session comprises:
- a location for each of one or more walls within the environment;
- a location for each of one or more doors within the environment;
- a category of the environment; and
- a location for each of one or more objects within the environment.

17. The system of claim 15, wherein the one or more descriptive characteristics about the one or more people comprises, for each person of the one or more people:
- an engagement metric with the current audio-video communication session; and
- an affinity between the person and at least one other person of the one or more people.

18. The system of claim 17, wherein the engagement metric for each person of the one or more people is based at least in part on a count of words spoken by the person, a physical distance between the person and the computing device, an amount of time the person has been in the environment during the current audio-video communication system, or social graph data associated with the person.

19. The system of claim 15, wherein the processors are further operable when executing the instructions to generate a historical descriptive model based on a plurality of past audio-video communication sessions that have occurred within the environment, wherein the one or more descriptive characteristics are based at least in part on the historical descriptive model.

20. The system of claim 15, wherein the one or more instructions comprise instructions to zoom in on a visual target, pan toward a visual target, beamform a microphone to an audio target, or cut a scene to a visual target.

* * * * *